(12) United States Patent
Du et al.

(10) Patent No.: US 12,092,760 B2
(45) Date of Patent: Sep. 17, 2024

(54) LiDAR ANTI-INTERFERENCE METHOD AND APPARATUS, STORAGE MEDIUM, AND LiDAR

(71) Applicant: SUTENG INNOVATION TECHNOLOGY CO., LTD., Shenzhen (CN)

(72) Inventors: Yajun Du, Shenzhen (CN); Shengqiang Pan, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/087,807

(22) Filed: Dec. 22, 2022

(65) Prior Publication Data
US 2023/0204725 A1    Jun. 29, 2023

(30) Foreign Application Priority Data

Dec. 23, 2021 (CN) .................. 202111593084.0
Dec. 31, 2021 (CN) .................. 202111681548.3

(51) Int. Cl.
*G01S 7/48* (2006.01)
*G01S 17/89* (2020.01)

(52) U.S. Cl.
CPC .......... *G01S 7/4808* (2013.01); *G01S 7/4802* (2013.01); *G01S 17/89* (2013.01)

(58) Field of Classification Search
CPC ....... G01S 7/4808; G01S 7/4802; G01S 17/89
USPC ....................................................... 356/4.01
See application file for complete search history.

(56) References Cited

U.S. PATENT DOCUMENTS 11,726,184 B2 * 8/2023 Ferreira ............... G01S 7/4815
356/4.01

FOREIGN PATENT DOCUMENTS

CN       110927734 A    3/2020

OTHER PUBLICATIONS

First Office Action issued in related Chinese Application No. 202111681548.3, mailed Jun. 7, 2023, 8 pages.

\* cited by examiner

*Primary Examiner* — Daniel L Murphy
(74) *Attorney, Agent, or Firm* — BAYES PLLC

(57) ABSTRACT

This application discloses a LiDAR anti-interference method and apparatus, a storage medium, and a LiDAR. The method is applied to a LiDAR, and the LiDAR includes a laser emission array and a laser receiving array. The method includes determining at least two laser emission units to be turned on in a measurement period, controlling the at least two laser emission units to emit laser beams based on a preset rule, and controlling respectively corresponding laser receiving units of the at least two laser emission units to receive echo beams, to detect a target object. The at least two laser emission units to be turned on are in different laser emission groups, and the at least two laser emission units to be turned on satisfy a physical condition of no optical crosstalk.

7 Claims, 29 Drawing Sheets

Determine at least two laser emission units to be turned on in a measurement period, where the at least two laser emission units to be turned on are in different laser emission groups, and the at least two laser emission units to be turned on satisfy a physical condition of no optical crosstalk — S101

Control the at least two laser emission units to emit laser beams based on a preset rule, and control respectively corresponding laser receiving units of the at least two laser emission units to receive echo beams, to detect a target object — S102

S101: Determine at least two laser emission units to be turned on in a measurement period, where the at least two laser emission units to be turned on are in different laser emission groups, and the at least two laser emission units to be turned on satisfy a physical condition of no optical crosstalk S102: Control the at least two laser emission units to emit laser beams based on a preset rule, and control respectively corresponding laser receiving units of the at least two laser emission units to receive echo beams, to detect a target object

FIG. 1

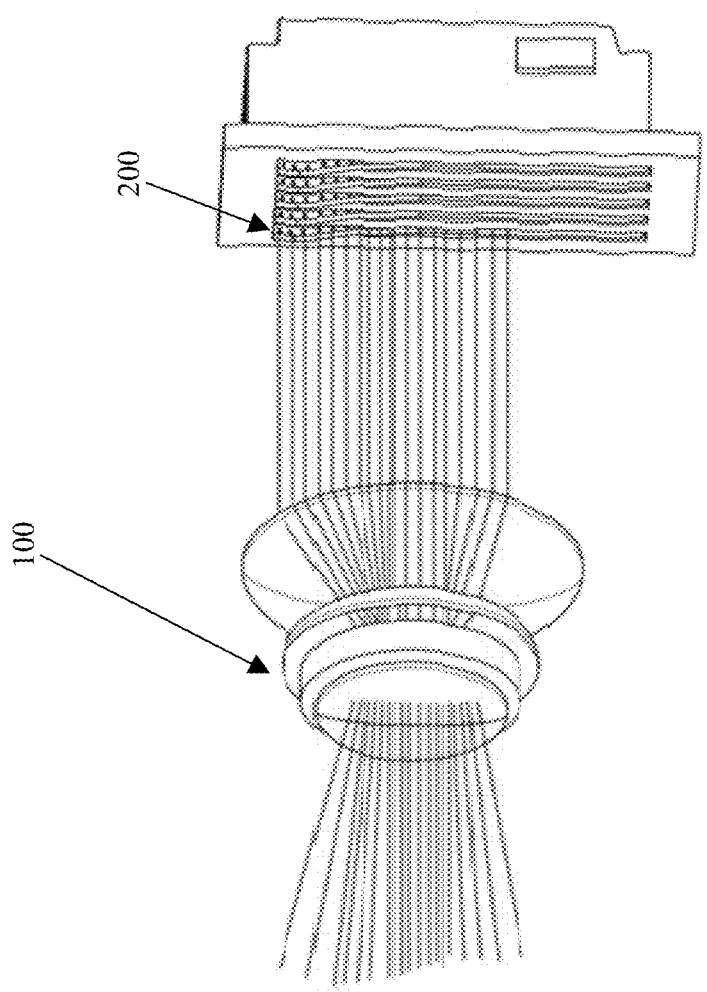
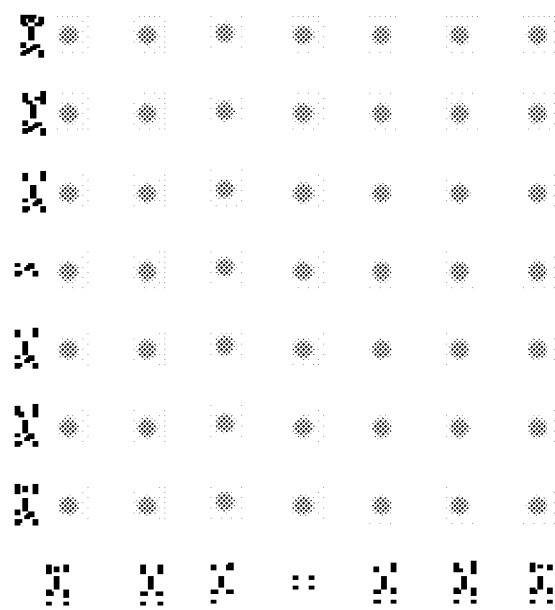
FIG. 23

LiDAR ANTI-INTERFERENCE METHOD AND APPARATUS, STORAGE MEDIUM, AND LiDAR

CROSS-REFERENCE TO RELATED APPLICATION

The present application claims the benefit of priority to China Patent Application No. CN 202111593084.0, filed on Dec. 23, 2021, and China Patent Application No. CN 202111681548.3, filed on Dec. 31, 2021, the contents of which are incorporated herein by reference in their entireties.

TECHNICAL FIELD

This application relates to the field of computer technologies, and in particular, to a LiDAR anti-interference method and apparatus, a storage medium, and a LiDAR.

BACKGROUND

A multi-sensor system includes multiple groups of laser emitters and receiving sensors, the groups of laser emitters and receiving sensors are in a parallel relationship, and a laser emitter and a receiving sensor in the same group are in a serial relationship. Currently, LiDARs are mainstream radar sensors, and mainly obtain point cloud data through echoes of emitted lasers, to detect objects in environments. However, for a multi-line LiDAR, multiple laser beams emitted by the multi-line LiDAR may interfere with each other, thereby affecting obtained point cloud data and further reducing detection accuracy of the LiDAR.

SUMMARY

Embodiments of this application provide a LiDAR anti-interference method and apparatus, a storage medium, and a LiDAR, so that a crosstalk problem can be prevented when a laser receiving unit receives an echo beam, thereby improving accuracy of point cloud data. A technical solution is as follows.

According to a first aspect, an embodiment of this application provides a LiDAR anti-interference method, where the LiDAR includes a laser emission array and a laser receiving array, and the method includes:

determining at least two laser emission units to be turned on in a measurement period, where the at least two laser emission units to be turned on are in different laser emission groups, and the at least two laser emission units to be turned on satisfy a physical condition of no optical crosstalk; and controlling the at least two laser emission units to emit laser beams based on a preset rule, and controlling respectively corresponding laser receiving units of the at least two laser emission units to receive echo beams, to detect a target object.

According to a second aspect, an embodiment of this application provides a LiDAR anti-interference apparatus, where the LiDAR includes a laser emission array and a laser receiving array, and the apparatus includes:

a unit determining module, configured to determine at least two laser emission units to be turned on in a measurement period, where the at least two laser emission units to be turned on are in different laser emission groups, and the at least two laser emission units to be turned on satisfy a physical condition of no optical crosstalk; and a target detection module, configured to control the at least two laser emission units to emit laser beams based on a preset rule, and control respectively corresponding laser receiving units of the at least two laser emission units to receive echo beams, to detect a target object.

According to a third aspect, an embodiment of this application provides a computer storage medium, where the computer storage medium stores a plurality of instructions, and the instructions are capable of being loaded by a processor to perform the steps of the foregoing method.

According to a fourth aspect, an embodiment of this application provides LiDAR, including a processor and a memory, where the memory stores a computer program, and the computer program is capable of being loaded by the processor to perform the steps of the forgoing method.

The beneficial effects provided by the technical solutions of some embodiments of the present application are as follows.

In this embodiment, the LiDAR includes the laser emission array and the laser receiving array; at least two laser emission units to be turned on in a measurement period are determined, where the at least two laser emission units to be turned on are in the different laser emission groups, and the at least two laser emission units to be turned on satisfy the physical condition of no optical crosstalk; and the at least two laser emission units are controlled to emit the laser beams based on the preset rule, and the respectively corresponding laser receiving units of the at least two laser emission units are controlled to receive the echo beams, to detect the target object. Therefore, when the laser receiving unit receives the corresponding laser, crosstalk can be avoided, and accuracy of the point cloud data can be further improved.

BRIEF DESCRIPTION OF DRAWINGS

To explain embodiments of the present application, the following briefly introduces the drawings for the embodiments. It is noted that the drawings in the following description only represent some embodiments of the present application.

FIG. 1 is a schematic flowchart of a LiDAR anti-interference method according to an embodiment of this application;

FIG. 23 is a diagram of an exemplary structure of a mechanical LiDAR according to an embodiment of this application;

DETAILED DESCRIPTION

Figure 2:
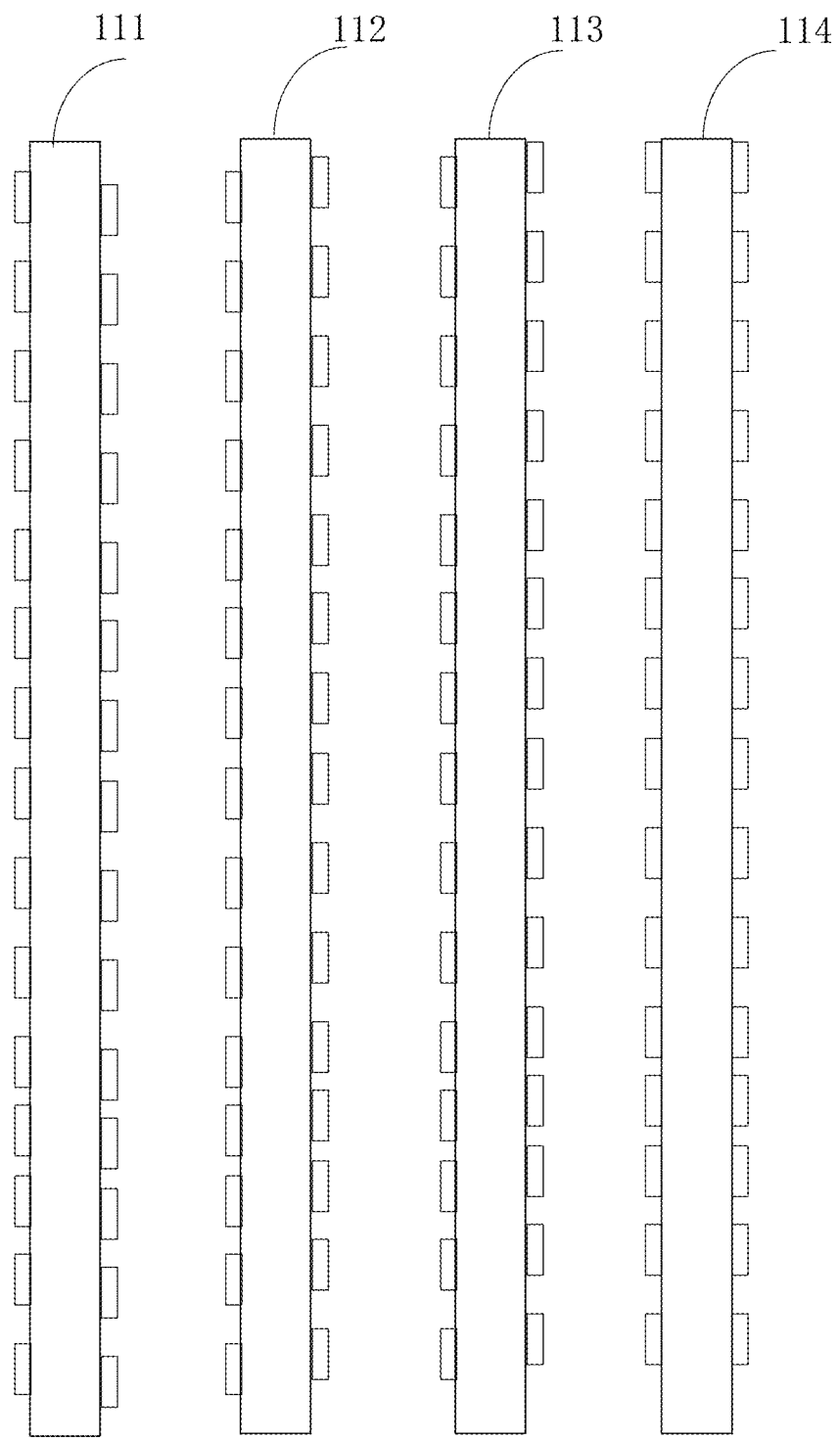
FIG. 2 is a schematic diagram of an example of a laser emission array according to an embodiment of this application.

To make objectives, technical solutions and advantages of the present application clearer, embodiments of the present application are described in further detail below with reference to the drawings.

When the following description refers to the drawings, unless otherwise indicated, the same numbers in different drawings indicate the same or similar elements. The implementation described in the following exemplary embodiments do not represent all implementations consistent with the present application. On the contrary, the implementation is merely examples of devices and methods consistent with some aspects of the present application as detailed in the appended claims.

In the description of the present application, it shall be understood that the terms such as "first" and "second" are merely intended for a purpose of description, and shall not be understood as an indication or implication of relative importance. The person skilled in the art can understand specific meanings of the foregoing terms in the present application to a specific situation. In addition, in the descriptions of this application, "a plurality of" means two or more unless otherwise specified. Herein, "and/or" is an association relationship for describing associated objects and indicates that three relationships may exist. For example, A and/or B may mean the following three cases: only A exists, both A and B exist, and only B exists. The character "/" generally indicates an "or" relationship between the associated objects.

The LiDAR anti-interference method provided in this embodiment of this application is described in detail below with reference to FIG. 1 to FIG. 11. The method may be implemented by a computer program, which can run on a LiDAR anti-interference apparatus based on the Von Neumann architecture. The computer program can be integrated into an application or run as an independent tool application. A LiDAR anti-interference apparatus in this embodiment of this application may be any device using the LiDAR anti-interference method. The device includes, but is not limited to, a vehicle-mounted device, an airplane, a train, a handheld device, a wearable device, a computing device, or another processing device connected to a wireless modem.

After a laser emitter emits a laser beam, if a reflected laser has relatively high energy or a corresponding light spot is relatively large, the reflected laser beam is diffusely reflected to be incident on a receiving sensor in another group, and as a result, the receiving sensor in another group receives the echo beam through a receiving channel other than a corresponding channel, which causes interference and affects accuracy of measured point cloud data.

Referring to FIG. 1, FIG. 1 is a schematic flowchart of a LiDAR anti-interference method according to an embodiment of this application.

As shown in FIG. 1, the method in this embodiment of this application may include the following steps.

S101. Determine at least two laser emission units to be turned on in a measurement period, where the at least two laser emission units to be turned on are in different laser emission groups, and the at least two laser emission units to be turned on satisfy a physical condition of no optical crosstalk.

The laser emission array may include a preset number of laser emission groups, the laser receiving array may include a preset number of laser receiving groups, and the preset number of laser emission groups is corresponding to the preset number of laser receiving groups. A laser emission group may include two laser emitters, and a laser receiving group may include two laser receivers. Laser emitters in the same group are in a relationship of serial emission, but laser emitters in different groups are in a relationship of parallel emission.

For example, as shown in FIG. 2, the laser emission array may include four laser emission groups: a group 111, a group 112, a group 113, and a group 114. Herein, each laser emission group is disposed on an emission plate. As an example, each laser emission group includes 32 laser emitters, and each group of laser emitters may be respectively disposed on front and back surfaces of the emission plate. Herein, as an example, the laser emitter may be an edge emitter. Herein, laser emitters in each laser emission group are in a relationship of serial emission. Different emission groups are in a parallel emission relationship.

Figure 3:
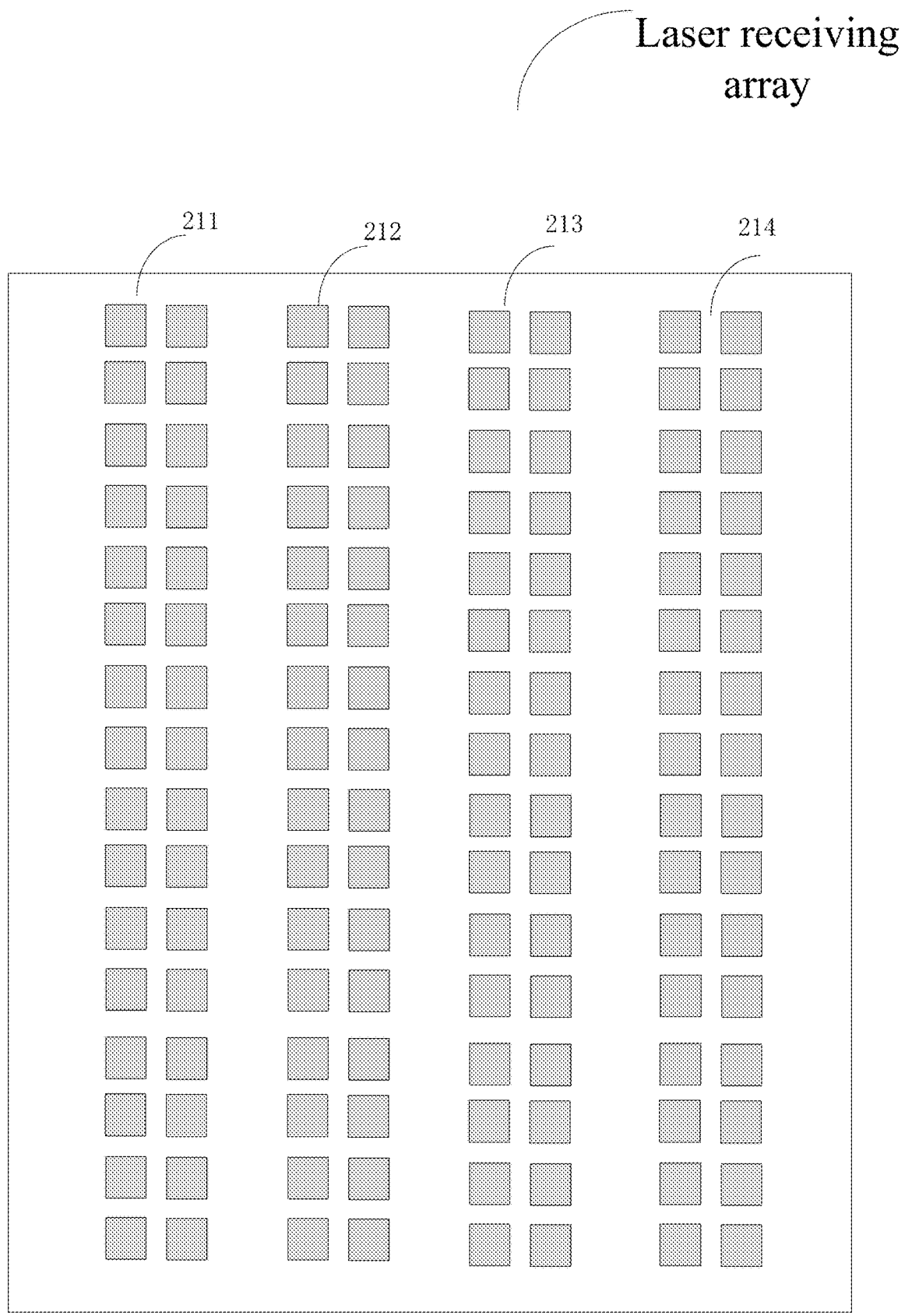
FIG. 3 is a schematic diagram of an example of a laser receiving array according to an embodiment of this application.

FIG. 3 shows a receiving array. The receiving array is a receiving array corresponding to the emission array in FIG. 2. As an example, receiving units in the receiving array are in a one-to-one correspondence with the emission units shown in FIG. 2.

It can be understood that an emitter group may include multiple emission units. For example, as shown in FIG. 2, the laser emission group 111 and the laser emitter group 112 may include multiple emission units shown in FIG. 2. It can be understood that each emission unit can include at least one laser emitter. It can be understood that each emission unit can alternatively include multiple laser emitters. This is not limited in this application.

For any emission unit of the LiDAR, a detection period includes multiple emission periods, that is, each emission unit performs multiple emissions in the detection period.

As shown in FIG. 2, determining at least two laser emission units to be turned on in a measurement period may be determining laser emission units to be turned on from the laser emitter group 111 and determining laser emission units to be turned on from the laser emitter group 112 in the measurement period, where the laser emission units to be turned on in the laser emitter group 111 and the laser emitter group 112 satisfy the physical condition of no optical crosstalk.

The at least two laser emission units are controlled to emit laser beams based on a preset rule, and respectively corresponding laser receiving units of the at least two laser emission units are controlled to receive echo beams, to detect a target object.

After the at least two laser emission units are controlled to emit laser beams to the target object based on the preset rule, when the emitted laser beams are incident on the target object, echo beams generated after reflection reach the at least two laser receiving units corresponding to the at least two laser emission units, to detect the target object.

For example, after the laser emission unit in the laser emitter group 111 and the laser emission unit in the laser emitter group 112 emit laser beams to the target object based on the preset rule, the laser beams are received by a laser receiving unit in a laser receiver 211 and a laser receiving unit in a laser receiver 212, and point cloud data of the target object can be obtained based on the received laser beams.

In this embodiment, at least two laser emission units to be turned on in a measurement period are determined, where the at least two laser emission units to be turned on are in the different laser emission groups, and the at least two laser emission units to be turned on satisfy the physical condition of no optical crosstalk. The at least two laser emission units are controlled to emit the laser beams based on the preset rule, and the respectively corresponding laser receiving units of the at least two laser emission units are controlled to receive the echo beams, to detect the target object. Therefore, when the laser receiving unit receives the corresponding laser, crosstalk can be avoided, and accuracy of the point cloud data can be further improved.

Figure 4:
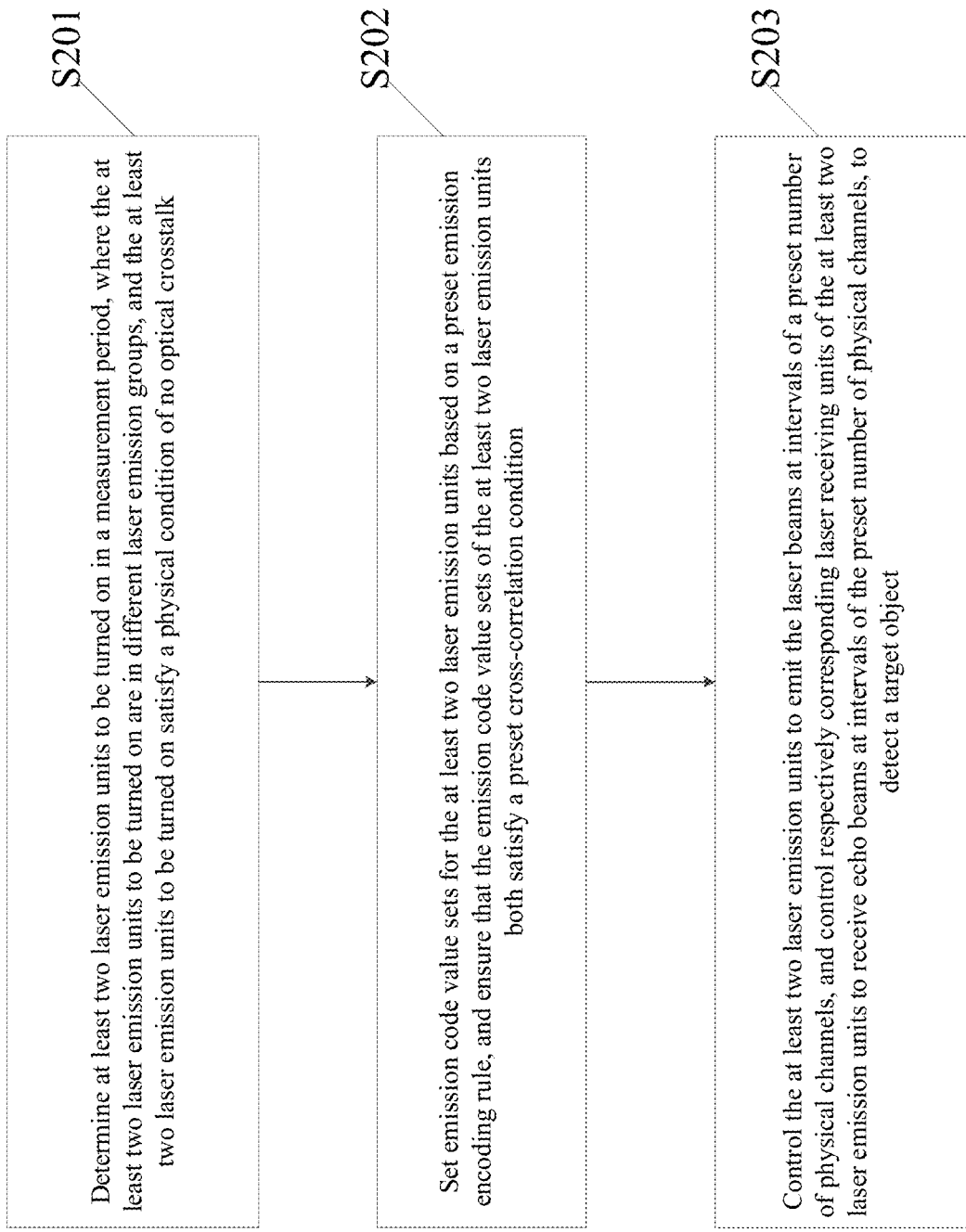
FIG. 4 is a schematic flowchart of a LiDAR anti-interference method according to an embodiment of this application.

FIG. 4 is a schematic flowchart of a LiDAR anti-interference method according to an embodiment of this application.

S201. Determine at least two laser emission units to be turned on in a measurement period, where the at least two laser emission units to be turned on are in different laser emission groups, and the at least two laser emission units to be turned on satisfy a physical condition of no optical crosstalk.

Herein, the determining at least two laser emission units to be turned on in a measurement period includes:
determining light spot offset of each laser emission unit in the at least two laser emission groups; and
determining at least two laser emission units to be turned on based on the light spot offset of each laser emission unit, where the at least two laser emission units to be turned on are in the different laser emission groups.

It can be understood that, a main benefit of determining the at least two emission units to be turned on based on the light spot offset of each laser emission unit is that, offset of an echo light spot of any one of the at least two emission units to be turned on will not be received by a receiver corresponding to another emission unit to be turned on, which otherwise would cause crosstalk.

Figure 5:
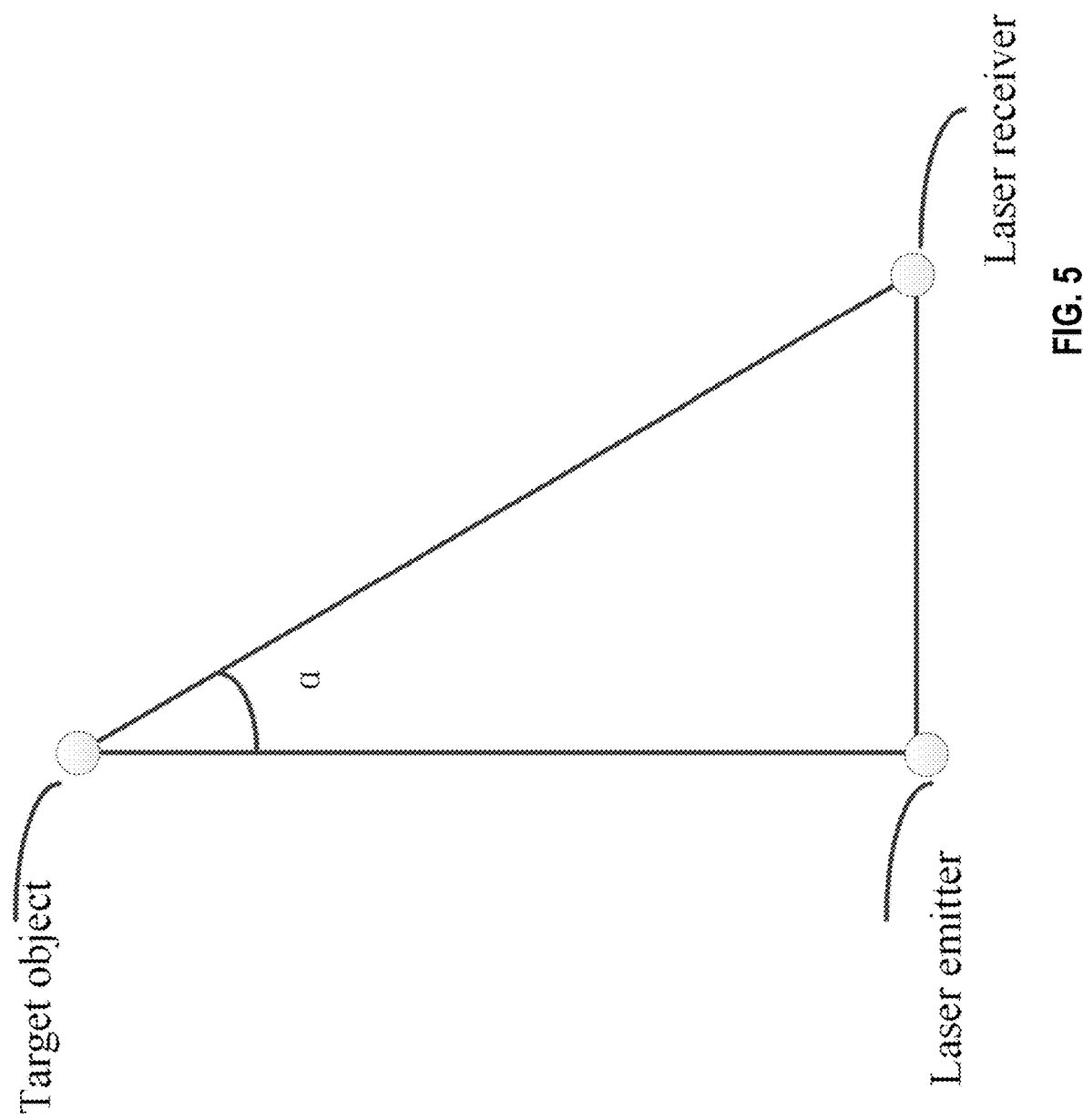
FIG. 5 is a schematic diagram of an example of a ranging scenario according to an embodiment of this application.

Offset of a light spot corresponding to a laser emission unit is calculated as a focal length of a lens corresponding to the laser emission unit multiplied by $\tan \alpha$. As shown in FIG. 5, $\tan \alpha$ is a ratio of a target detection distance corresponding to the laser emission units versus a distance between receivers corresponding to the two emission units. As an exemplary embodiment, the laser emission units in the laser emission group may be grouped based on a difference in distances from different laser emission units in the laser emission group to a central optical axis of the lens. For example, the laser emission units may be divided into an emission unit group corresponding to a central detection field of view and an emission unit group corresponding to an edge detection field of view. It can be understood that, offset of a light spot of the central detection field of view is small, and offset of a light spot of the laser emission unit in the edge detection field of view is large. Therefore, an emission condition of the laser emission units to be turned on can be designed based on a group to which the emission units to be turned on belong. For example, if the at least two emission units belong to a group corresponding to the edge detection field of view, channels of the at least two emission units are spaced by a first preset number of channels; or if the at least two emission units belong to a group corresponding to the central detection field of view, channels of the at least two emission units are spaced by a second preset number of channels. The first preset number is greater than the second preset number.

As another exemplary embodiment, based on a difference in detection distances of laser emission units in different laser emission groups, the laser emission units may be divided into different groups and an emission condition of the laser emission units to be turned on are designed based on the group to which the emission units to be turned on belong. For example, each laser emitter group is divided into three groups based on a difference in detection distance ranges. A distance range of the first group is within a first preset range, for example, 5 m-10 m; a distance range of the second group is within a second preset range, for example, 10 m-100 m; and a distance range of the third group is within the third preset range, for example, 100 m-200 m. Therefore, channels of at least two emission units in the first group are spaced by the first preset number of channels; channels of at least two laser emission units in the second group are spaced by the second number of channels; and channels of at least two laser emission units in the third group are spaced by the third number of channels. The first preset number is greater than the second preset number, and the second preset number is greater than the third preset number.

S202. Set emission code value sets for the at least two laser emission units based on a preset emission encoding rule, and ensure that the emission code value sets of the at least two laser emission units both satisfy a preset cross-correlation condition.

First, at least two pseudorandom sequences are generated by a linear feedback shift register.

Based on a definition of the linear feedback shift register, it can be learned that there should be at least one input sequence. The input sequence can be set by the LiDAR based on an actual need. This is not limited herein. In consideration that this embodiment of this application aims to reduce crosstalk of different batches of echo signals of the emission units, as an example, values in the input sequence may be different from each other. At least two pseudorandom sequences can be generated through continuous feedback and re-input of the linear feedback shift register.

Then a cross-correlation coefficient of any two pseudorandom sequences is obtained by calculating a cross-correlation function of the any two pseudorandom sequences.

The LiDAR can first calculate a cross-correlation function of each pseudorandom sequence, to obtain a cross-correlation coefficient of each pseudorandom sequence. Specifically, the cross-correlation function can be obtained based on the following formula:

$$CCF(a, b, \tau) = \Sigma_{i=1}^{P} a_i b_{i+\tau}$$

Herein, $a_i$ is a pseudorandom sequence, $b_{i+\tau}$ is another pseudorandom sequence, $CCF(a, b, \tau)$ is a cross-correlation function of the pseudorandom sequences $a_i$ and $b_{i+\tau}$, and $\tau$ is preset time offset.

Finally, a pseudorandom sequence whose cross-correlation coefficient satisfies a preset cross-correlation condition is screened out, and an emission code value set is determined based on the pseudorandom sequence that is screened out.

The cross-correlation condition is mainly intended to screen out pseudorandom sequences with minimum cross-correlation, to reduce possibility of crosstalk of echo signals during parallel emission. As an example, a cross-correlation coefficient threshold can be preset, and cross-correlation coefficients of any two pseudorandom sequences can be compared with the cross-correlation coefficient threshold, to screen out multiple pseudorandom sequences whose cross-correlation coefficients are less than the cross-correlation coefficient threshold. A screening method is not limited herein. Therefore, the LiDAR can determine an emission code value set of each parallel emission unit based on the pseudorandom sequences that are screened out. For example, three pseudorandom sequences S1, S2, and S3 are obtained, cross-correlation between any two of the three pseudorandom sequences is relatively small, and in this way, an emission code value set of an emission unit A can be determined based on S1, an emission code value set of an emission unit B can be determined based on S2, and an emission code value set of an emission unit C can be determined based on S3.

It can be understood that, as an example, a reference moment may also be preset in each detection period. Based on a concept of the reference moment, the emission code value set is a set of emission code values, and the emission code value is used to represent time delay of the emission moment of the emission unit relative to the reference moment. Herein, the code value in the emission code value set satisfies an autocorrelation condition. The LiDAR can first calculate an autocorrelation function of each pseudorandom sequence, to obtain an autocorrelation coefficient of each pseudorandom sequence. Specifically, the autocorrelation function can be obtained based on the following formula:

$$ACF(a, \tau) = \Sigma_{i=1}^{P} a_i a_{i+\tau}$$

Herein, $ACF(a, \tau)$ is the autocorrelation function, $a_i$ represents an $i^{th}$ pseudorandom sequence, and $\tau$ is preset time offset. Herein, it can be understood that the autocorrelation condition is mainly to keep the autocorrelation coefficient of the emission code value set within a relatively small range, that is, to keep autocorrelation between emission code values in the same emission code value set less than a preset threshold.

As an exemplary embodiment, a reference moment is set based on a first detection period, an emission code value set is established based on the reference moment, and the emission code value set includes a preset number of different emission code values, so that autocorrelation of the emission code value set is minimal. When at least two laser emission units are controlled to emit laser beams, two emission code values can be randomly selected for emission control. In addition, it is ensured that the emission code values extracted within preset duration are different, and the emission code values can be reused after the preset duration expires.

S203. Control the at least two laser emission units to emit the laser beams at intervals of a preset number of physical channels, and control respectively corresponding laser receiving units of the at least two laser emission units to receive echo beams, to detect a target object.

Figure 6:
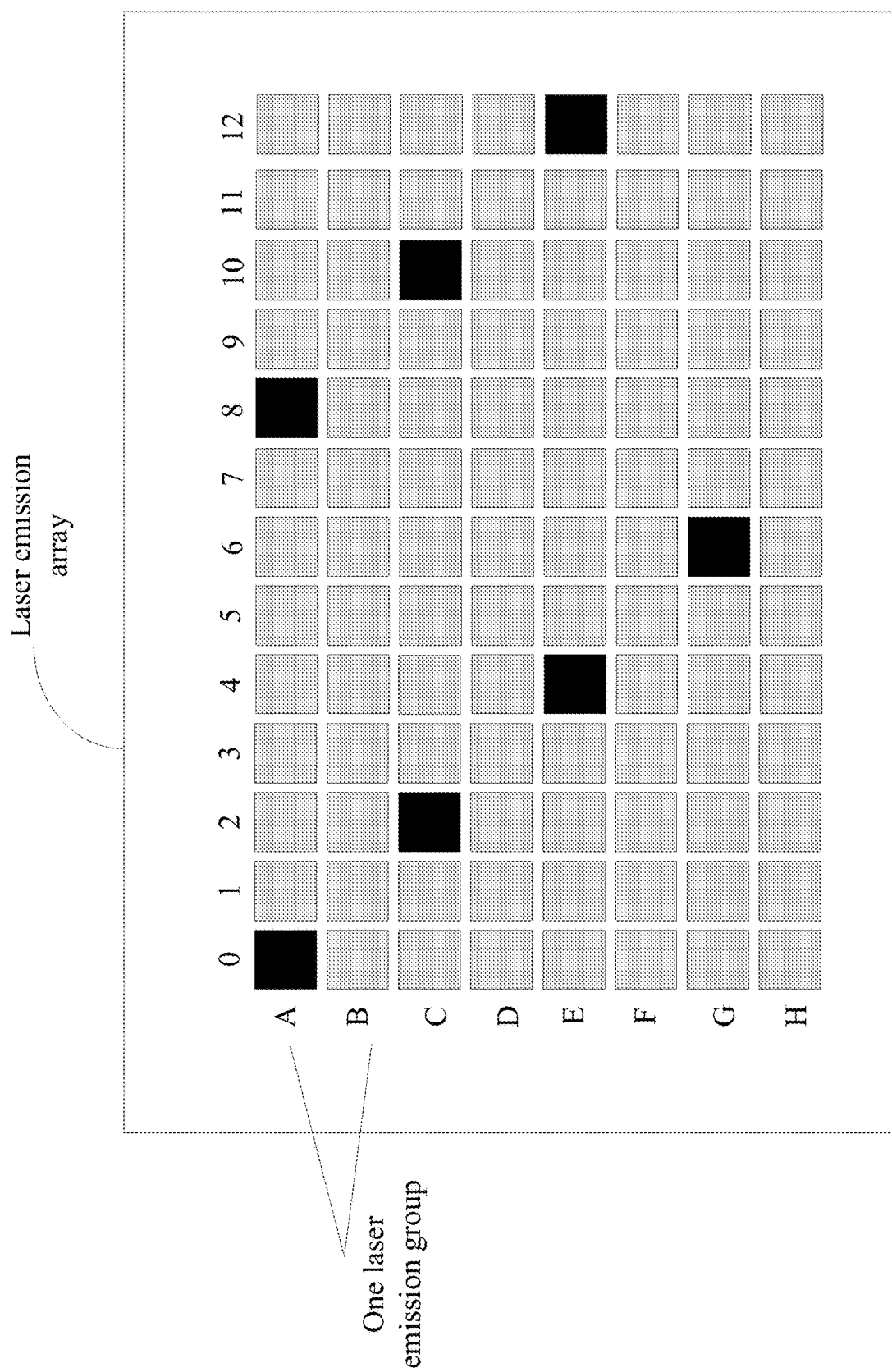
FIG. 6 is a schematic diagram of an example of a laser emission array according to an embodiment of this application.
Figure 7:
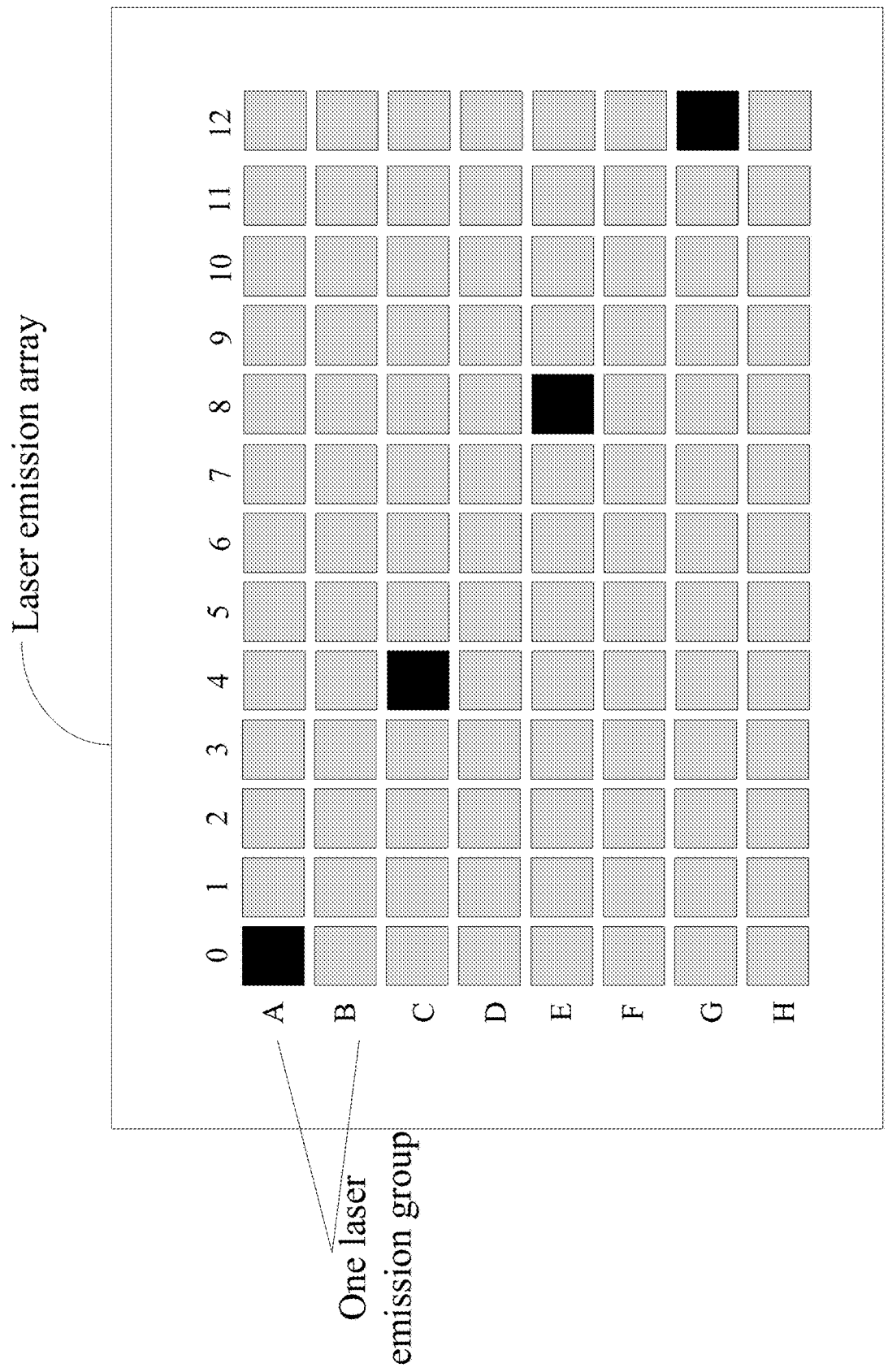
FIG. 7 is a schematic diagram of an example of a laser emission array according to an embodiment of this application.
Figure 8:
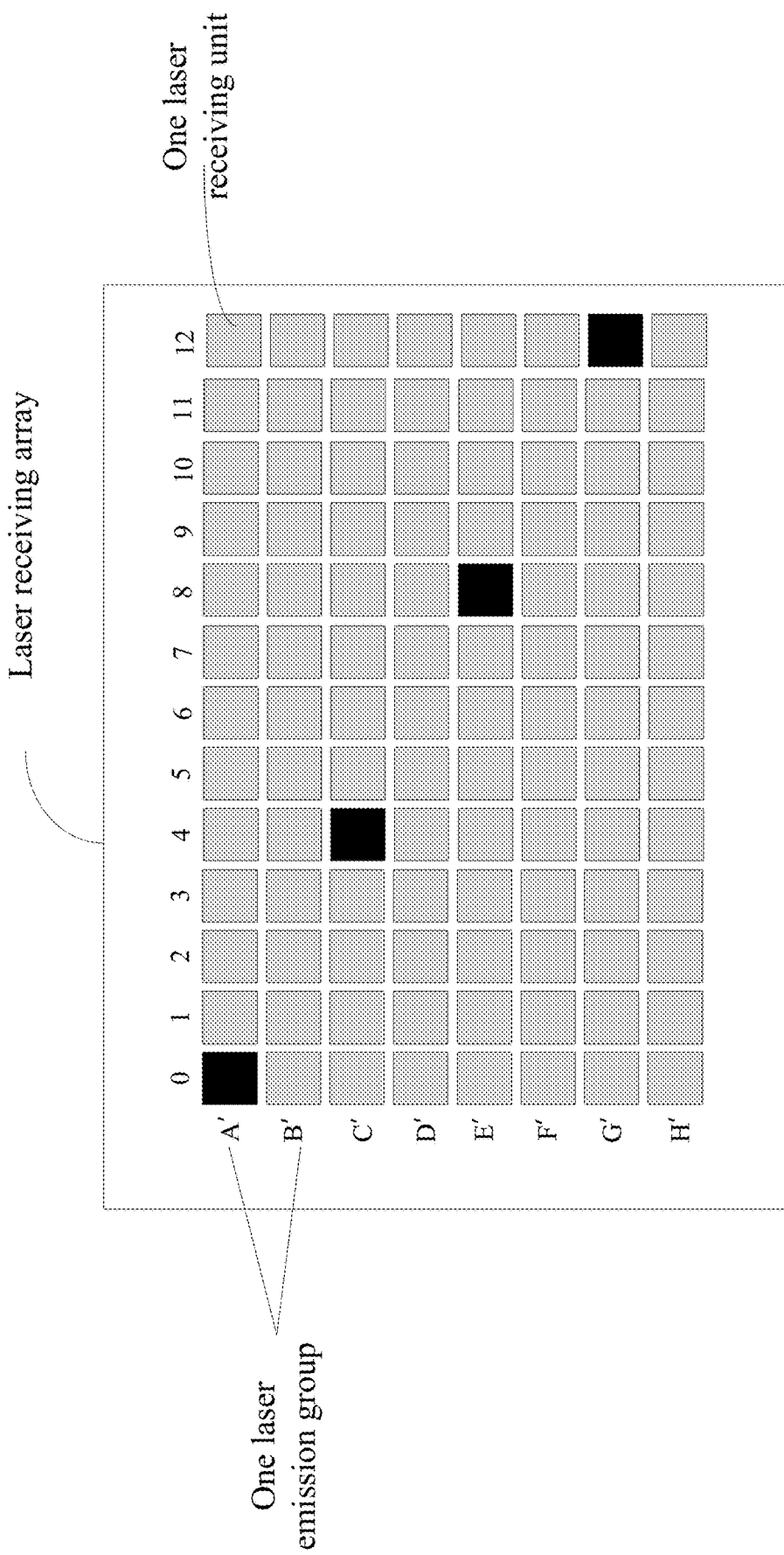
FIG. 8 is a schematic diagram of an example of a laser receiving array according to an embodiment of this application.
Figure 9:
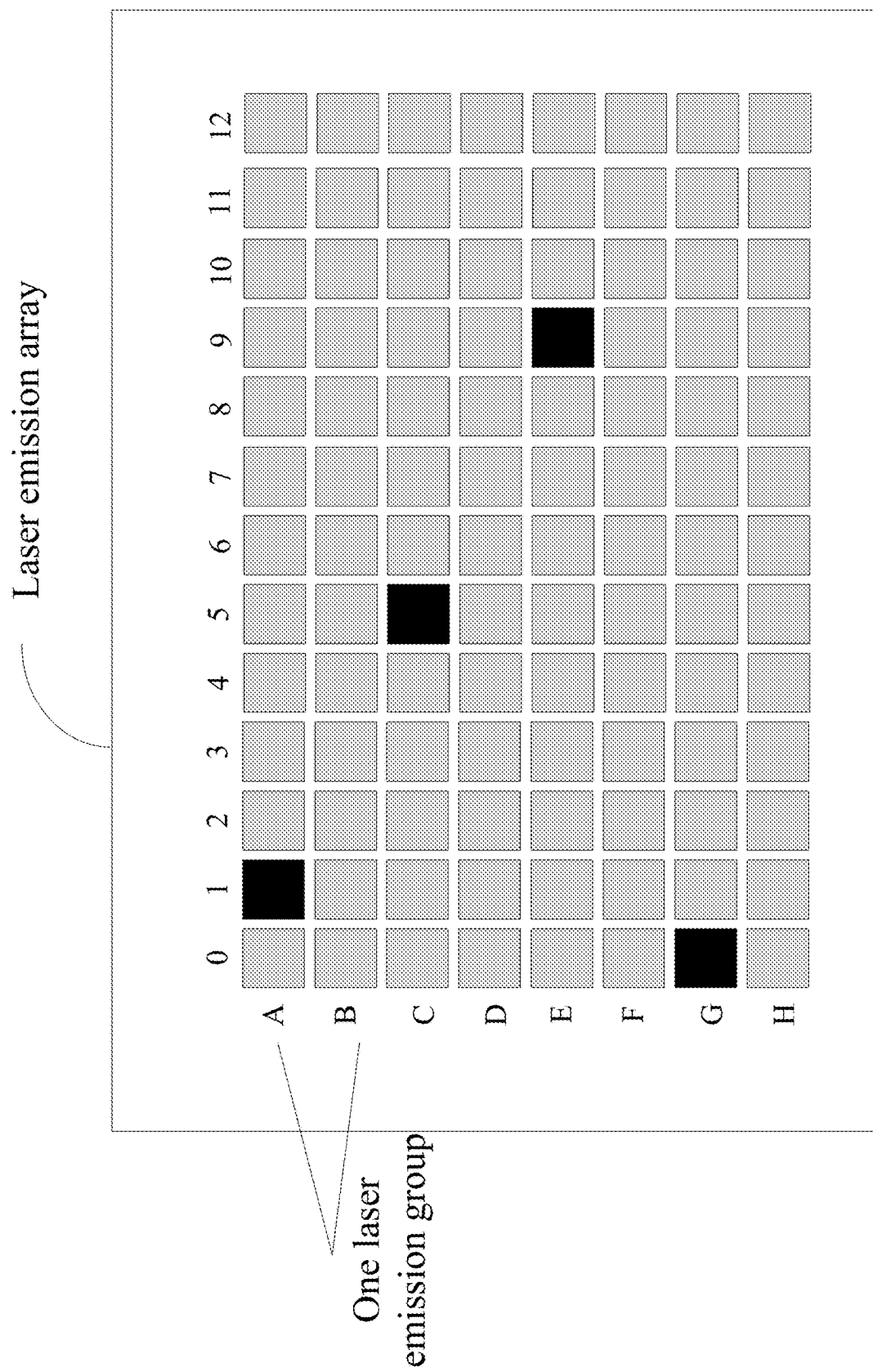
FIG. 9 is a schematic diagram of an example of a laser emission array according to an embodiment of this application.
Figure 10:
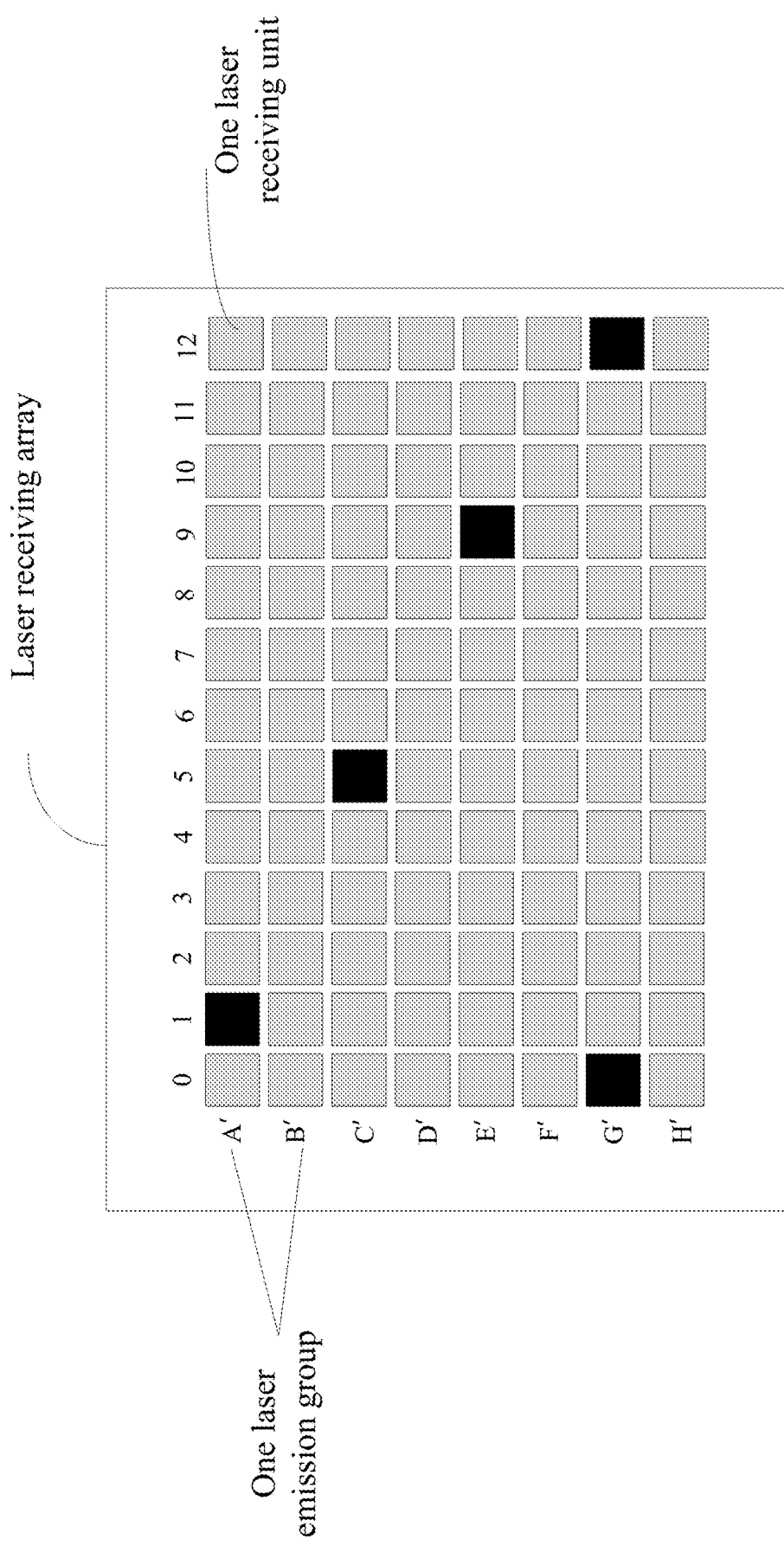
FIG. 10 is a schematic diagram of an example of a laser receiving array according to an embodiment of this application.

When the emission code value sets of the at least two laser emission units both satisfy a preset cross-correlation condition, the at least two laser emission units are controlled to emit the laser beams at intervals of a preset number of physical channels, where the preset number can vary based on an actual situation. For example, when there is a relatively short distance between the LiDAR and a target object, emission is performed at intervals of a greater preset number of physical channels compared with a case that the distance between the LiDAR and the target object is relatively large. For example, when the distance between the LiDAR and the target object is predicted to exceed 200 m, as shown in FIG. 6, the at least two laser emission units are controlled to emit laser beams at intervals of 2 physical channels; and as shown in FIG. 7, when the distance between the LiDAR and the target object is predicted to be within 100 m to 200 m, the at least two laser emission units are controlled to emit laser beams at intervals of 4 physical channels. When the at least two laser emission units emit the laser beams at intervals of the preset number of physical channels, laser receiving units corresponding to the at least two laser emission units at intervals of the preset number of physical channels are required to receive the echo beams. When the at least two laser emission units are controlled to emit laser beams at intervals of 4 physical channels, for example, as shown in FIG. 8, emission units A0, C4, E8, and G12 are controlled to emit laser beams, receiving units A'0, C'4, E'8, and G'12 corresponding to those emission units need to be controlled to receive the echo beams. In a next detection period, as shown in FIG. 9, when the emission units A1, C5, E9, and G0 emit laser beams, as shown in FIG. 10, receiving units A'1, C'5, E'9, and G'0 corresponding to those emission units need to be controlled to receive the echo beams.

It can be understood that, when the at least two laser emission units are controlled to emit the laser beams based on the preset rule, selection of the emission code value and the number of emission channels used as the interval should be comprehensively considered, that is, the echo laser beams are controlled from two perspectives of emission control and physical optical isolation, to avoid crosstalk, thereby improving accuracy of point cloud data.

In this embodiment, at least two laser emission units to be turned on in a measurement period are determined, where the at least two laser emission units to be turned on are in the different laser emission groups, and the at least two laser emission units to be turned on satisfy the physical condition of no optical crosstalk. The emission code value sets are set for the at least two laser emission units based on the preset emission encoding rule, and it is ensured that the emission code value sets of the at least two laser emission units both satisfy the preset cross-correlation condition. The at least two laser emission units are controlled to emit the laser beams at intervals of the preset number of physical channels, and the respectively corresponding laser receiving units of the at least two laser emission units are controlled to receive the echo beams at intervals of the preset number of physical channels, to detect the target object. Therefore, when the laser receiving unit receives the corresponding echo beam, crosstalk can be avoided, and accuracy of the point cloud data can be further improved.

Figure 11:
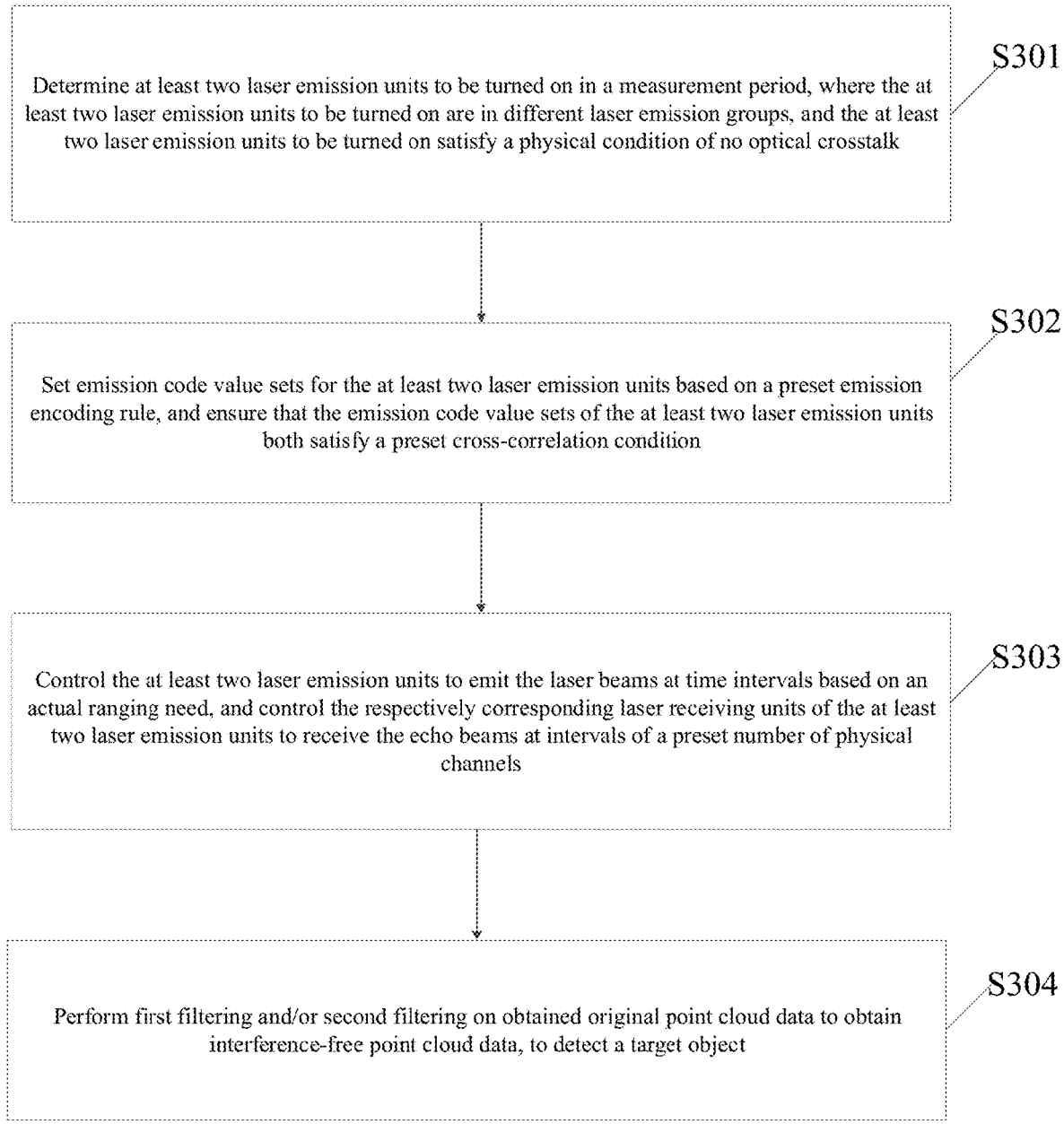
FIG. 11 is a schematic flowchart of a LiDAR anti-interference method according to an embodiment of this application.

FIG. 11 is a schematic flowchart of a LiDAR anti-interference method according to an embodiment of this application.

S301. Determine at least two laser emission units to be turned on in a measurement period, where the at least two laser emission units to be turned on are in different laser emission groups, and the at least two laser emission units to be turned on satisfy a physical condition of no optical crosstalk.

For details, refer to S101. Details are not described herein again.

S302. Set emission code value sets for the at least two laser emission units based on a preset emission encoding rule, and ensure that the emission code value sets of the at least two laser emission units both satisfy a preset cross-correlation condition.

For details, refer to S202. Details are not described herein again.

S303. Control the at least two laser emission units to emit the laser beams at time intervals based on an actual ranging need, and control the respectively corresponding laser receiving units of the at least two laser emission units to receive the echo beams at intervals of a preset number of physical channels.

When receiving distances of the laser receiving units are different, grouping may be performed based on the same distance. Ranging distances of laser receivers in the same group can be the same, and ranging distances of laser receivers in different groups can be different. Therefore, the laser beams can be emitted at time intervals based on an actual need. For example, when the ranging distance is greater than 200 m, a laser emission unit in a laser emitter in a group AB is used to emit a laser beam; or when the ranging distance is less than 200 m, a laser emission unit in a laser emitter of a group CD is used to emit a laser beam.

For controlling of the respectively corresponding laser receiving units of the at least two laser emission units to receive the echo beams at intervals of a preset number of physical channels, refer to S203. Details are not described herein again.

S304. Perform first filtering and/or second filtering on obtained original point cloud data to obtain interference-free point cloud data, to detect a target object.

In this embodiment of this application, two filtering methods are proposed, namely, the first filtering and the second filtering respectively. It can be understood that for any to-be-detected point in the original point cloud data, as long as the to-be-detected point is determined to be valid in any filtering method, the to-be-detected point can be retained; otherwise, if the to-be-detected point is determined to be invalid in both the filtering methods, it is believed that the to-be-detected point is a noise point, and the to-be-detected point needs to be eliminated.

To avoid a waste of resources and improve efficiency of filtering, the to-be-detected point can be first detected in one filtering method (that is, the first filtering). If the to-be-detected point is determined to be valid through the first filtering, the to-be-detected point is retained, and there is no need to perform another filtering on the to-be-detected point. Otherwise, if the to-be-detected point is determined to be invalid through the first filtering, the to-be-detected point needs to be detected in another filtering method (that is, the second filtering). If the to-be-detected point is determined to be valid through the second filtering, the to-be-detected point is retained. Otherwise, if the to-be-detected point is still determined to be invalid through the second filtering, the to-be-detected point is finally determined to be surely invalid, and the to-be-detected point can be eliminated from the original point cloud data.

In some embodiments, for any to-be-detected point in the original point cloud data, a detailed procedure of the first filtering is as follows.

First, a to-be-detected neighborhood centered on the to-be-detected point is determined based on a preset neighborhood size.

Then, a difference between a ranging value of each point in the to-be-detected neighborhood other than the to-be-detected point and a ranging value of the to-be-detected point is calculated.

Usually, in the point cloud obtained based on a target perpendicular to a surface and a 0-degree (horizontal or vertical) direction of the LiDAR, a difference between ranging values of points is relatively small. Based on this, the difference between the ranging value of each point in the to-be-detected neighborhood other than the to-be-detected point and the ranging value of the to-be-detected point is calculated. It can be understood that in an M*N neighborhood, there are M*N−1 points in addition to the to-be-detected point. Differences between ranging values of the M*N−1 points and the to-be-detected point are separately calculated, to obtain M*N−1 differences.

Finally, based on the obtained differences, it is determined whether the to-be-detected point is valid.

Based on the foregoing steps, the difference between the ranging values of the points in the to-be-detected neighborhood should be relatively small. This can be used as a determining standard, and the obtained M*N−1 differences are analyzed to determine whether the to-be-detected point is valid. Specifically, to exclude occasional interference and reduce incorrect analysis, a number threshold can be preset; then based on the number threshold, the following process can be performed to analyze whether the to-be-detected point is valid. The number of target differences in the obtained M*N−1 differences is counted, where the target difference refers to a difference less than a preset difference threshold; if the number of target differences reaches the number threshold, it is determined that the to-be-detected point is valid; otherwise, if the number of target differences is less than the number threshold, a result of the second filtering is required to determine whether the to-be-detected point is valid.

As an example, assuming that M is 3, N is 3, and the to-be-detected point is denoted as $P_0$, a 3*3 neighborhood can be determined from the original point cloud by using the to-be-detected point $P_0$ as a center. For ease of description, points in the neighborhood other than the to-be-detected point $P_0$ are denoted as $P_1$, $P_2$, $P_3$, $P_4$, $P_5$, $P_6$, $P_7$, and $P_8$, respectively. Then when the first filtering is performed, a difference between a ranging value of $P_1$ and a ranging value of $P_0$ can be calculated and denoted as $d_{01}$, a difference between a ranging value of $P_2$ and a ranging value of $P_0$ can be calculated and denoted as $d_{02}$, and so on, until a difference between the ranging value of $P_8$ and the ranging value of $P_0$ is calculated and denoted as $d_{08}$. In addition, $d_{01}$, $d_{02}$, ..., $d_{08}$ are compared with a preset difference threshold d separately, and it can be learned how many of $d_{01}$, $d_{02}$, ..., $d_{08}$ are less than the difference threshold d, that is, the number l of target differences can be learned. Assuming that the number threshold is $l_0$, when $l \geq l_0$, it can be determined that the to-be-detected point is valid, and the to-be-detected point can be retained; or when $l < l_0$, it can be determined that the to-be-detected point is invalid, and a result of the second filtering is required to finally determine whether to retain or eliminate the to-be-detected point.

In some embodiments, for any to-be-detected point in the original point cloud data, a detailed procedure of the second filtering is as follows.

First, at least two points in a preset direction are obtained by using the to-be-detected point as a center in the original point cloud data.

Usually, in the point cloud obtained based on a target that forms a specific angle with a surface and a 0-degree (horizontal or vertical) direction of the LiDAR, a difference between ranging values of points may be significant. In this case, if the first filtering is still performed, a normal point may be incorrectly eliminated. For such case, second filtering is proposed as a supplement to the first filtering.

Each point in the point cloud can be denoted based on coordinates (x, y, d), where x is used to represent horizontal displacement of the point relative to the LiDAR, y is used to represent vertical displacement of the point relative to the LiDAR, and d represents depth information, that is, the ranging value. In this context, a direction mentioned in this embodiment of this application is actually not a direction presented by each point and the to-be-detected point in three-dimensional space; instead, the direction is a direction presented by each point and the to-be-detected point in a two-dimensional plane xy after the point cloud is projected to the plane xy (that is, a direction presented by each point and the to-be-detected point based on the x, y coordinates).

As an example, the preset directions may include a total of four directions: a horizontal direction, a vertical direction, and ±45 degree directions. It is conceivable that the four directions are centered on the to-be-detected point, and forms an "asterisk" shape on the plane xy. The to-be-detected point is denoted as $P_1$. Irrespective of the depth information, the to-be-detected point can be denoted as $P_1$ ($x_0$, $y_0$);

points in the horizontal direction of the to-be-detected point include: ..., $P_2$ ($x_0-2$, $y_0$), $P_3$ ($x_0-1$, $y_0$), $P_4$ ($x_0+1$, $y_0$), $P_5$ ($x_0+2$, $y_0$), ... ;

points in the vertical direction of the to-be-detected point include: ..., $P_6$ ($x_0$, $y_0-2$), $P_7$ ($x_0$, $y_0-1$), $P_8$ ($x_0$, $y_0+1$), $P_9$ ($x_0$, $y_0+2$), ... ;

points in the +45 degree direction of the to-be-detected point include: ..., $P_{10}$ ($x_0-2$, $y_0-2$), $P_{11}$ ($x_0-1$, $y_0-1$), $P_{12}$ ($x_0+1$, $y_0+1$), $P_{13}$ ($x_0+2$, $y_0+2$), ... ; and points in the −45 degree direction of the to-be-detected point include: ..., $P_{10}$ ($x_0-2$, $y_0+2$), $P_{11}$ ($x_0-1$, $y_0+1$), $P_{12}$ ($x_0+1$, $y_0-1$), $P_{13}$ ($x_0+2$, $y_0-2$), ... .

Then, the at least two points and the to-be-detected point are fitted.

When there is only one preset direction, obtained ranging values of the at least two points and the to-be-detected point can be directly fitted.

When there are more than two preset directions, obtained ranging values of the at least two points and the to-be-detected point in one preset direction can be fitted in sequence. For example, firstly, ranging values of the at least two points in the horizontal direction of the to-be-detected point and the ranging value of the to-be-detected point are fitted. Then ranging values of the at least two points in the vertical direction of the to-be-detected point and the ranging value of the to-be-detected point are fitted. Next, ranging values of the at least two points in the +45 degree direction of the to-be-detected point and the ranging value of the to-be-detected point are fitted. Finally, ranging values of the at least two points in the −45 degree direction of the to-be-detected point and the ranging value of the to-be-detected point are fitted.

Finally, based on a fitting result, it is determined whether the to-be-detected point is valid.

In the point cloud obtained based on a target that forms a specific angle with a surface and a 0-degree (horizontal or vertical) direction of the LiDAR, points in a specific direction should be capable of being fitted into a straight line. To save processing resources and improve processing efficiency, in this embodiment of this application, only targeted processing is performed based on preset directions of the to-be-detected point, and it is detected whether points in the preset directions can be fitted into a straight line. When a fitting result indicates that the at least two points in the preset direction in step D2 and the to-be-detected point can be fitted into a straight line, it can be determined that the to-be-detected point is valid.

It should be noted that, when there are more than two preset directions, provided that the fitting result indicates that at least two points in any preset direction and the to-be-detected point can be fitted into a straight line, the to-be-detected point can be determined to be valid, and in this case, another preset direction in which fitting is not performed can be ignored. Otherwise, if the fitting result indicates that none of the at least two points in each preset direction and the to-be-detected point can be fitted into a straight line, it is determined that the to-be-detected point is invalid, and the result of the first filtering is required to finally determine whether to retain or eliminate the to-be-detected point.

In this embodiment, at least two laser emission units to be turned on in a measurement period are determined, where the at least two laser emission units to be turned on are in the different laser emission groups, and the at least two laser emission units to be turned on satisfy the physical condition of no optical crosstalk. The emission code value sets are set for the at least two laser emission units based on the preset emission encoding rule, and it is ensured that the emission code value sets of the at least two laser emission units both satisfy the preset cross-correlation condition. The at least two laser emission units are controlled to emit the laser beams at time intervals based on an actual ranging need, the respectively corresponding laser receiving units of the at least two laser emission units are controlled to receive the echo beams at intervals of the preset number of physical channels, and the first filtering and/or the second filtering is performed on obtained original point cloud data to obtain interference-free point cloud data, to detect the target object. Therefore, when the laser receiving unit receives the corresponding laser, crosstalk can be avoided, and accuracy of the point cloud data can be further improved through filtering.

A device embodiment of this application is provided below, and can be used to perform the method embodiments of this application. For details not disclosed in this device embodiment of this application, refer to the method embodiments of this application.

Figure 12:
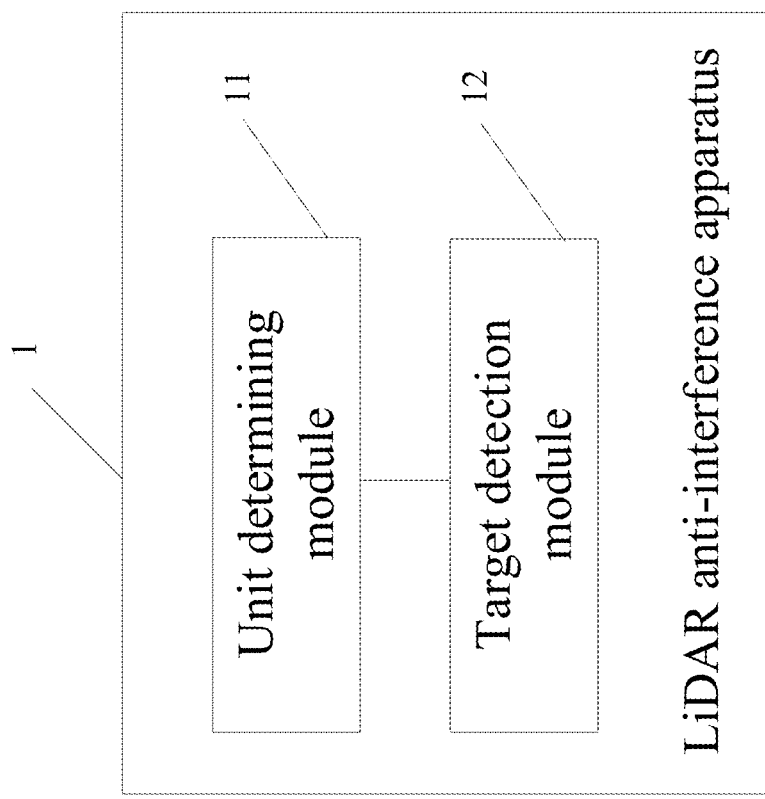
FIG. 12 is a schematic structural diagram of a LiDAR anti-interference apparatus according to an embodiment of this application.

FIG. 12 is a schematic structural diagram of a LiDAR anti-interference apparatus according to an embodiment of this application. The LiDAR anti-interference apparatus can be implemented as all or a part of a terminal through software, hardware, or a combination thereof. The apparatus 1 includes a unit determining module 11 and a target detection module 12.

The unit determining module 11 is configured to determine at least two laser emission units to be turned on in a measurement period, where the at least two laser emission units to be turned on are in different laser emission groups, and the at least two laser emission units to be turned on satisfy a physical condition of no optical crosstalk.

The target detection module 12 is configured to control the at least two laser emission units to emit laser beams based on a preset rule, and control respectively corresponding laser receiving units of the at least two laser emission units to receive echo beams, to detect a target object.

In some embodiments, the unit determining module 11 is specifically configured to:
based on offset of light spots corresponding to the at least two laser emission units to be turned on, set an emission condition for the at least two laser emission units to be turned on, so that the at least two laser emission units to be turned on satisfy a physical condition of no optical crosstalk, where offset of a light spot corresponding to a laser emission unit=a focal length of a lens corresponding to the laser emission unit×tan α, where tan α is a ratio of a target detection distance corresponding to the laser emission units versus a distance between receivers corresponding to the two emission units.

In some embodiments, the target detection module 12 is specifically configured to:
control the at least two laser emission units to emit the laser beams at intervals of a preset number of physical channels;
or
control the at least two laser emission units to emit the laser beams at time intervals based on an actual ranging need.

Figure 13:
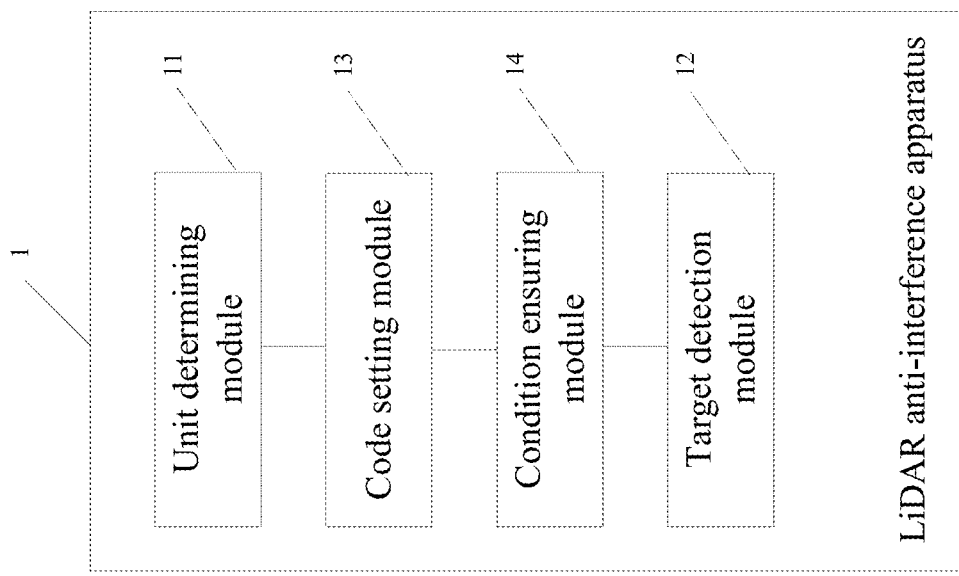
FIG. 13 is a schematic structural diagram of a LiDAR anti-interference apparatus according to an embodiment of this application.

In some embodiments, as shown in FIG. 13, the apparatus 1 further includes:
a code setting module 13, configured to set emission code value sets for the at least two laser emission units based on a preset emission encoding rule; and
a condition ensuring module 14, configured to ensure that the emission code value sets of the at least two laser emission units both satisfy a preset cross-correlation condition.

In some embodiments, the target detection module 12 is specifically configured to:
control the respectively corresponding laser receiving units of the at least two laser emission units to receive the echo beams at intervals of a preset number of physical channels.

Figure 14:
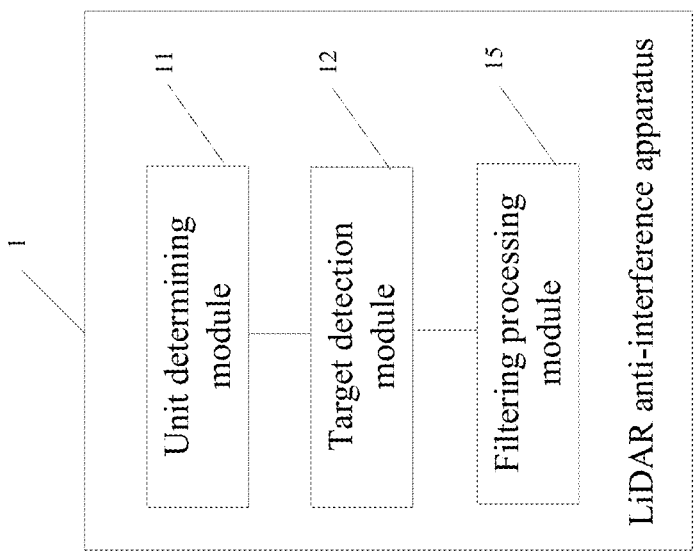
FIG. 14 is a schematic structural diagram of a LiDAR anti-interference apparatus according to an embodiment of this application.

In some embodiments, as shown in FIG. 14, the apparatus 1 further includes:
a filtering module 15, configured to perform first filtering and/or second filtering on obtained original point cloud data to obtain interference-free point cloud data.

Figure 15:
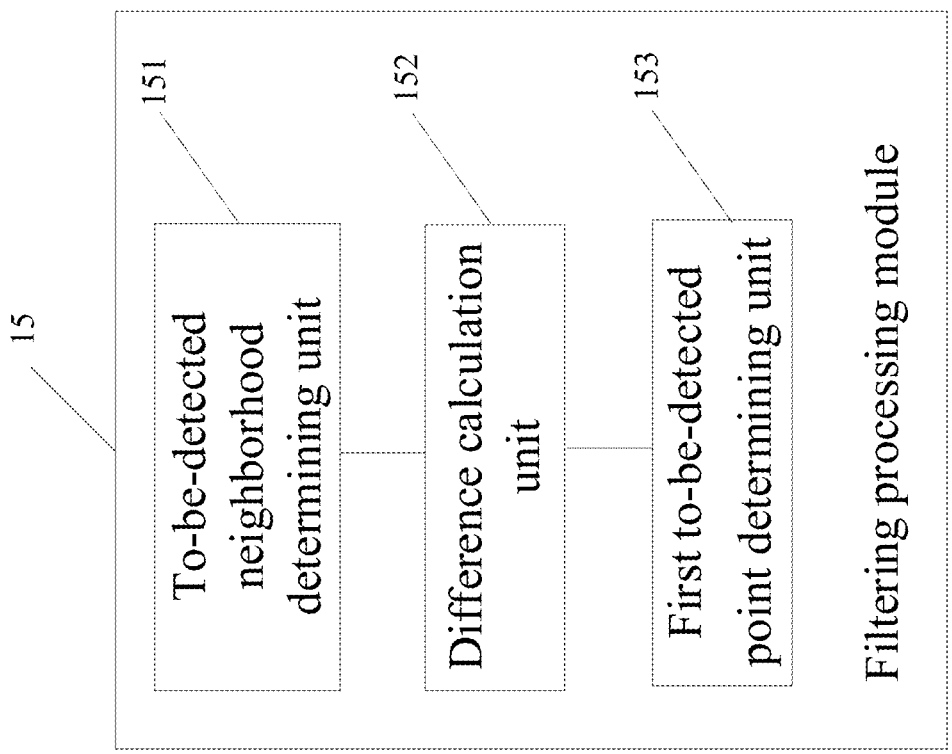
FIG. 15 is a schematic structural diagram of a filtering module according to an embodiment of this application.

In some embodiments, as shown in FIG. 15, the filtering module 15 includes:
a to-be-detected neighborhood determining unit 151, configured to, for each to-be-detected point in the original point cloud data, based on a preset neighborhood size, determine a to-be-detected neighborhood centered on the to-be-detected point;
a difference calculation unit 152, configured to calculate a difference between a ranging value of each point in the to-be-detected neighborhood other than the to-be-detected point and a ranging value of the to-be-detected point; and
a first to-be-detected point determining unit 153, configured to, based on the difference, determine whether the to-be-detected point is valid.

Figure 16:
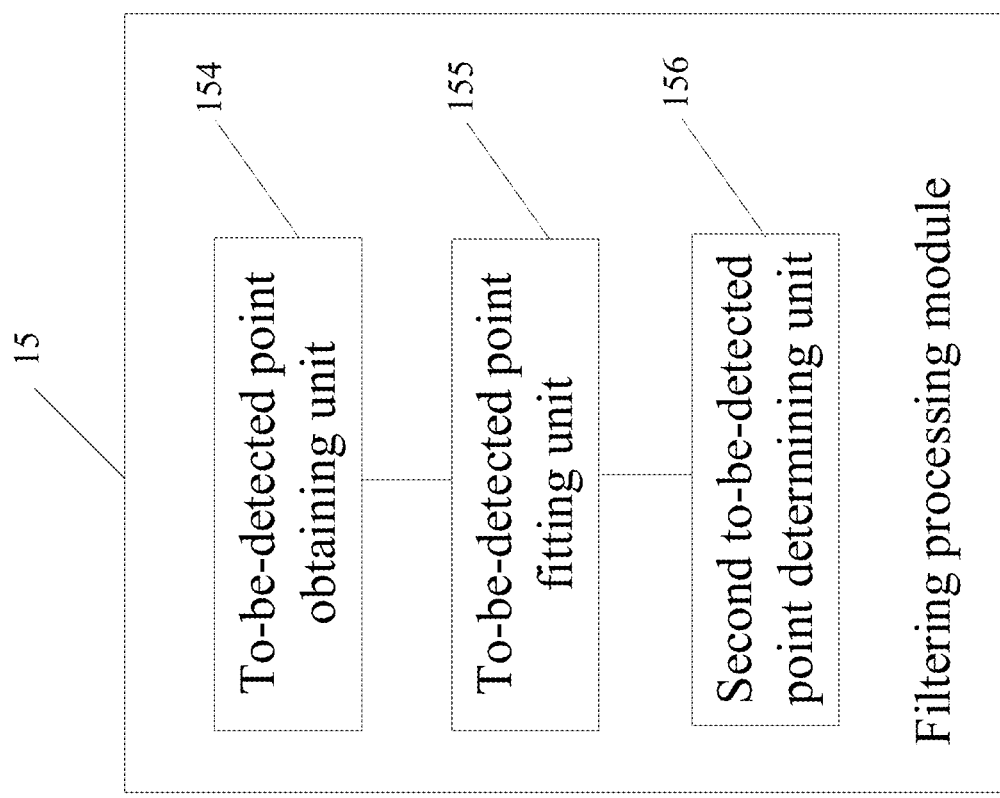
FIG. 16 is a schematic structural diagram of a LiDAR anti-interference apparatus according to an embodiment of this application.

In some embodiments, as shown in FIG. 16, the filtering module 15 includes:
a to-be-detected point obtaining unit 154, configured to, for each to-be-detected point in the original point cloud data, obtain at least two points in a preset direction by using the to-be-detected point as a center in the original point cloud data;
a to-be-detected point fitting unit 155, configured to fit the at least two points and the to-be-detected point; and
a second to-be-detected point determining unit 156, further configured to, based on a fitting result, determine whether the to-be-detected point is valid,
where the second to-be-detected point determining unit 156 is specifically configured to:
if the fitting result indicates that the at least two points and the to-be-detected point can be fitted into a straight line, determine that the to-be-detected point is valid.

In this embodiment of this application, at least two laser emission units to be turned on in a measurement period are determined, where the at least two laser emission units to be turned on are in the different laser emission groups, and the at least two laser emission units to be turned on satisfy the physical condition of no optical crosstalk. The emission code value sets are set for the at least two laser emission units based on the preset emission encoding rule, and it is ensured that the emission code value sets of the at least two laser emission units both satisfy the preset cross-correlation condition. The at least two laser emission units are controlled to emit the laser beams at time intervals based on an actual ranging need, the respectively corresponding laser receiving units of the at least two laser emission units are controlled to receive the echo beams at intervals of the preset number of physical channels, and the first filtering and/or the second filtering is performed on obtained original point cloud data to obtain interference-free point cloud data, to detect the target object. Therefore, when the laser receiving unit receives the corresponding laser, crosstalk can be avoided, and accuracy of the point cloud data can be further improved through filtering.

It should be noted that, when the LiDAR anti-interference apparatus provided in the foregoing embodiment performs the LiDAR anti-interference method, division of the foregoing functional modules is used as an example for illustration. In actual applications, the foregoing functions can be allocated to different functional modules for implementation based on a requirement, that is, an inner structure of the device is divided into different functional modules to implement all or some of the functions described above. In addition, embodiments of the LiDAR anti-interference apparatus and the LiDAR interference method provided above pertain to a same concept. For a specific implementation process, refer to the method embodiments. Details are not described herein again.

Serial numbers of the embodiments of this application are only intended for description, and do not indicate advantages or disadvantages among the embodiments.

An embodiment of this application also provides a computer storage medium. The computer storage medium may store a plurality of instructions. The instructions are capable of being loaded by a processor to perform the steps of the method in the embodiments shown in FIG. 1 to FIG. 11. For a specific execution process, refer to the specific description of the embodiments shown in FIG. 1 to FIG. 11. Details are not described herein again.

This application further provides a LiDAR. The LiDAR stores at least one instruction. The at least one instruction is capable of being loaded by a processor to perform the steps of the foregoing method in the embodiments shown in FIG. 1 to FIG. 11. For a specific execution process, refer to the specific description of the embodiments shown in FIG. 1 to FIG. 11. Details are not described herein again.

Figure 17:
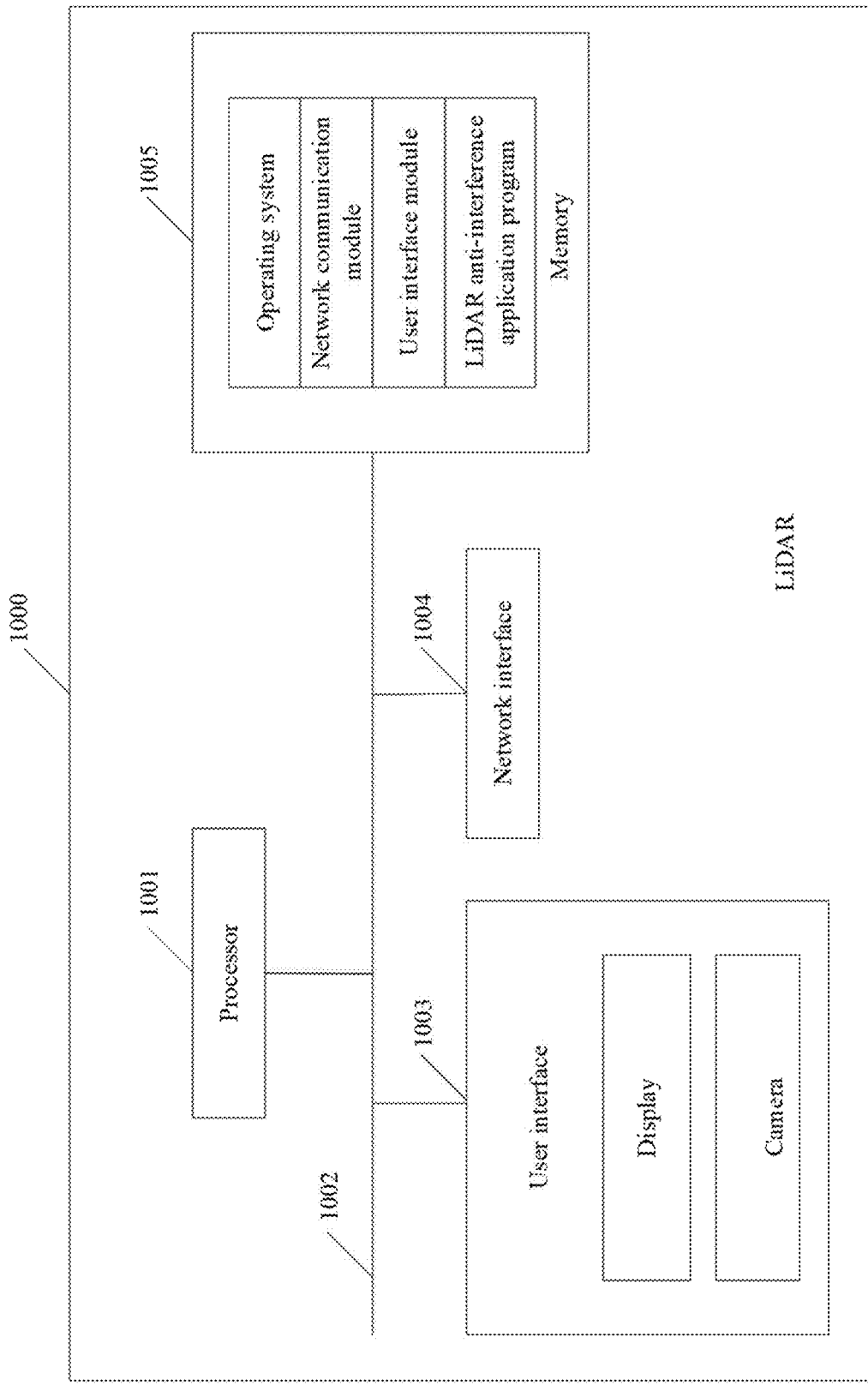
FIG. 17 is a schematic structural diagram of a LiDAR according to an embodiment of this application.

FIG. 17 is a schematic structural diagram of a LiDAR according to an embodiment of this application. As shown in FIG. 17, a mobile terminal 1000 may include: at least one processor 1001, at least one network interface 1004, a user interface 1003, a memory 1005, and at least one communication bus 1002.

Herein, the communication bus 1002 is configured to implement a connection and communication between these components.

Herein, the user interface 1003 may include a display and a camera, or the user interface 1003 may further include a standard wired interface and a wireless interface.

Herein, the network interface 1004 may include a standard wired interface and a wireless interface (such as, a Wi-Fi interface).

Herein, the processor 1001 may include one or more processing cores. The processor 1001 uses various interfaces and lines to connect various parts of the entire LiDAR 1000, and executes various functions and processes data of the LiDAR 1000 by running or executing instructions, programs, code sets, or instruction sets stored in the memory 1005, and invoking data stored in the memory 1005. In some embodiments, the processor 1001 may be realized in at least one hardware form of digital signal processing (DSP), a field-programmable gate array (FPGA), and a programmable logic array (PLA). The processor 1001 may integrate a combination of one or more of a central processing unit (CPU), a graphics processing unit (GPU), a modem, or the like. The GPU is configured to render and draw content that needs to be displayed on a display. The modem is configured to process wireless communication. It may be understood that the forgoing modem may not be integrated into the processor 1001, and may be implemented by one chip independently.

The memory 1005 may include a random access memory (RAM), or a read-only memory (ROM). In some embodiments, the memory 1005 includes a non-transitory computer-readable medium. The memory 1005 may be configured to store instructions, programs, codes, code sets, or instruction sets. The memory 1005 may include a program storage region and a data storage region. The program storage region may store instructions for implementing the operating system, instructions for at least one function (such as a touch control function, a sound play function, and an image play function), and instructions for implementing each of the foregoing method embodiments. In some embodiments, the memory 1005 may also be at least one storage device distant from the forgoing processor 1001. As shown in FIG. 17, as a computer storage medium, the memory 1005 may include an operating system, a network communications module, a user interface module, and a LiDAR anti-interference application program.

In the mobile terminal 1000 shown in FIG. 17, the user interface 1003 is mainly configured to provide an input interface for a user to obtain data input by the user. The processor 1001 can be used to invoke the LiDAR anti-interference application program stored in the memory 1005, and specifically perform the following operations:

determining at least two laser emission units to be turned on in a measurement period, where the at least two laser emission units to be turned on are in different laser emission groups, and the at least two laser emission units to be turned on satisfy a physical condition of no optical crosstalk; and controlling the at least two laser emission units to emit laser beams based on a preset rule, and controlling respectively corresponding laser receiving units of the at least two laser emission units to receive echo beams, to detect a target object.

In an embodiment, when the at least two laser emission units to be turned on satisfy the physical condition of no optical crosstalk, the processor 1001 specifically performs the following operation:

based on offset of light spots corresponding to the at least two laser emission units to be turned on, setting an emission condition for the at least two laser emission units to be turned on, so that the at least two laser emission units to be turned on satisfy a physical condition of no optical crosstalk, where offset of a light spot corresponding to a laser emission unit=a focal length of a lens corresponding to the laser emission unit×tan α, where tan α is a ratio of a target detection distance corresponding to the laser emission units versus a distance between receivers corresponding to the two emission units.

In an embodiment, when controlling the at least two laser emission units to emit the laser beams based on the preset rule, the processor 1001 specifically performs the following operation:

controlling the at least two laser emission units to emit the laser beams at intervals of a preset number of physical channels;

or controlling the at least two laser emission units to emit the laser beams at time intervals based on an actual ranging need.

In an embodiment, the processor 1001 further performs the following operations:

setting emission code value sets for the at least two laser emission units based on a preset emission encoding rule; and ensuring that the emission code value sets of the at least two laser emission units both satisfy a preset cross-correlation condition.

In an embodiment, when controlling respectively corresponding laser receiving units of the at least two laser emission units to receive echo beams, the processor 1001 specifically performs the following operation:

controlling the respectively corresponding laser receiving units of the at least two laser emission units to receive the echo beams at intervals of a preset number of physical channels.

In an embodiment, when controlling respectively corresponding laser receiving units of the at least two laser emission units to receive echo beams, the processor 1001 further performs the following operation:

performing first filtering and/or second filtering on obtained original point cloud data to obtain interference-free point cloud data.

In an embodiment, when performing the first filtering, the processor 1001 specifically performs the following operations:

for each to-be-detected point in the original point cloud data, based on a preset neighborhood size, determining a to-be-detected neighborhood centered on the to-be-detected point;

calculating a difference between a ranging value of each point in the to-be-detected neighborhood other than the to-be-detected point and a ranging value of the to-be-detected point; and based on the difference, determining whether the to-be-detected point is valid.

In an embodiment, when performing the second filtering, the processor 1001 specifically performs the following operations:

for each to-be-detected point in the original point cloud data, obtaining at least two points in a preset direction by using the to-be-detected point as a center in the original point cloud data;

fitting the at least two points and the to-be-detected point; and based on a fitting result, determining whether the to-be-detected point is valid, where based on the fitting result, determining whether the to-be-detected point is valid includes:

if the fitting result indicates that the at least two points and the to-be-detected point can be fitted into a straight line, determining that the to-be-detected point is valid.

In this embodiment of this application, at least two laser emission units to be turned on in a measurement period are determined, where the at least two laser emission units to be turned on are in the different laser emission groups, and the at least two laser emission units to be turned on satisfy the physical condition of no optical crosstalk. The emission code value sets are set for the at least two laser emission units based on the preset emission encoding rule, and it is ensured that the emission code value sets of the at least two laser emission units both satisfy the preset cross-correlation condition. The at least two laser emission units are controlled to emit the laser beams at time intervals based on an actual ranging need, the respectively corresponding laser receiving units of the at least two laser emission units are controlled to receive the echo beams at intervals of the preset number of physical channels, and the first filtering and/or the second filtering is performed on obtained original point cloud data to obtain interference-free point cloud data, to detect the target object. Therefore, when the laser receiving unit receives the corresponding laser, crosstalk can be avoided, and accuracy of the point cloud data can be further improved through filtering.

Figure 18:
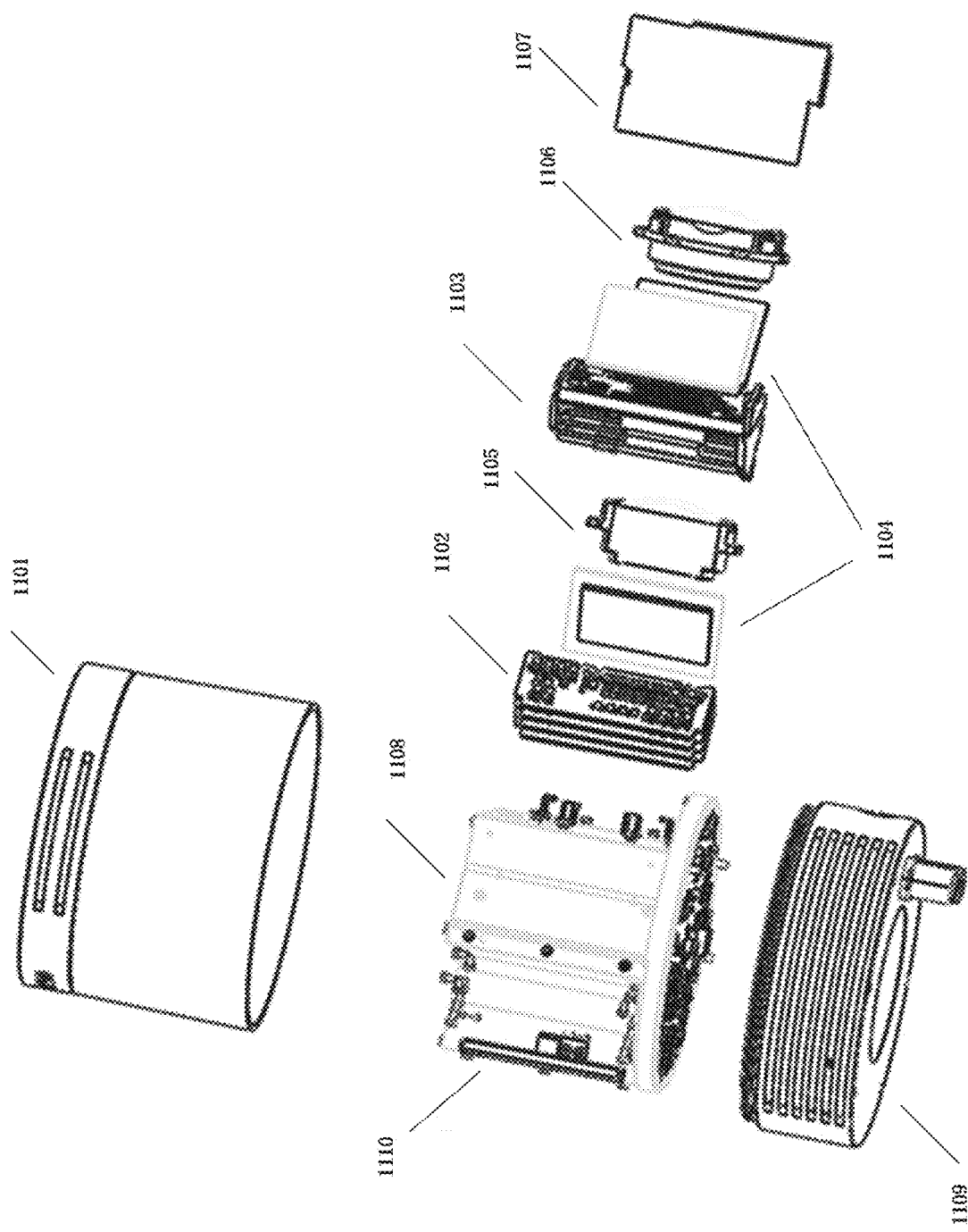
FIG. 18 is an exploded view of a LiDAR according to an embodiment of this application.

Referring to FIG. 18, FIG. 18 is an exploded view of a LiDAR according to an embodiment of this application. The LiDAR includes a housing 1101, an emission board group 1102, a receiving board 1103, a reflector 1104, an emission lens 1105, a receiving lens 1106, a lens partition 1107, an optical rotatable fixing bracket 1108, a rotatable drive base 1109, and a rotatable body end partition 1110. The optical rotatable fixing bracket 1108 is configured to fix the emission board group 1102, the receiving board 1103, the emission lens 1105, and the receiving lens 1106, and rotate together with the emission board group 1102, the receiving board 1103, the emission lens 1105, and the receiving lens 1106.

The partition 1107 is disposed between the emission lens 1105 and the receiving lens 1106 to prevent crosstalk between the emission optical path and the receiving optical path.

The rotatable drive base 1109 is disposed at a lower part of the optical rotatable fixing bracket 1108, and is configured to drive the rotatable fixing bracket 1108 to drive an emission and receiving optical system to rotate and scan.

The housing 1101 can be sleeved outside the rotatable fixing bracket 1108 to protect the emission and receiving optical system.

It can be understood that the emission board group 1102 may include the laser emission array shown in FIG. 2. The receiving board 1103 may include a receiving array shown in FIG. 3.

It can be understood that the LiDAR further includes a main control circuit board, and the specific type of a programmable device that may be included in the main control circuit board is not limited herein. Exemplarily, the programmable device may be Field-Programmable Gate Array (FPGA), Complex Programmable Logic Device (CPLD), Erasable Programmable Logic Device (EPLD), or the like. In actual applications, a user can control the programmable device to perform specific functions through programming.

It can be understood that the LiDAR in this embodiment of this application can control an emission array and a receiving array, and also process an echo signal through the main control circuit board, to implement the anti-interference method shown in FIG. 1, FIG. 4, and FIG. 11.

The person skilled in the art can understand that all or part of procedures in methods of the forgoing embodiments can be implemented by instructing relevant hardware via computer programs. The programs can be stored in a computer readable storage medium. During execution, the computer program scan include the procedures of the embodiments of the forgoing methods. A storage medium can be a magnetic disk, an optical disc, a read-only storage memory, a random storage memory, and so on.

The forgoing are only exemplary embodiments of the present application, which cannot be used to limit the scope of the present application. Therefore, equivalent changes made in accordance with the claims of the present application still fall within the scope of the present application.

Embodiment 1

A LiDAR anti-interference method, comprising:
determining an emission code value set for each emission unit of a LiDAR, wherein each emission code value set satisfies a preset autocorrelation condition;
based on the emission code value set of each emission unit, controlling each emission unit to emit a detection beam in each emission period, to obtain original point cloud data; and performing first filtering and/or second filtering on the original point cloud data to obtain interference-free point cloud data.

Embodiment 2

The method according to Embodiment 1, wherein, based on the emission code value set of each emission unit, before controlling each emission unit to emit a detection beam in each emission period, to obtain original point cloud data, the method further comprises:
when the LiDAR comprises multiple emission units, determining whether the multiple emission units comprise parallel emission units and/or serial emission units; and
setting an emission code value set for the parallel emission units and/or the serial emission units based on a preset rule.

Embodiment 3

The LiDAR anti-interference method according to Embodiment 2, wherein setting an emission code value set for the parallel emission units and/or the serial emission units based on a preset rule comprises:
if the emission units of the LiDAR comprise the parallel emission units, ensuring that emission code value sets of any two of the parallel emission units both satisfy the preset cross-correlation condition,
wherein the parallel emission units refer to emission units that simultaneously perform emission in the same detection period.

Embodiment 4

The LiDAR anti-interference method according to Embodiment 2, wherein
if the emission units of the LiDAR comprise the serial emission units, a difference between emission code values corresponding to the same emission of adjacent serial emission units in the same detection period is a preset threshold,
wherein the serial emission units refer to emission units that sequentially perform emission based on preset timing in the same detection period.

Embodiment 5

The LiDAR anti-interference method according to any one of Embodiments 1 to 4, wherein the first filtering comprises:
for each to-be-detected point in the original point cloud data, based on a preset neighborhood size, determining a to-be-detected neighborhood centered on the to-be-detected point;
calculating a difference between a ranging value of each point in the to-be-detected neighborhood other than the to-be-detected point and a ranging value of the to-be-detected point; and
based on the difference, determining whether the to-be-detected point is valid.

Embodiment 6

The LiDAR anti-interference method according to Embodiment 5, wherein based on the difference, determining whether the to-be-detected point is valid comprises:
counting the number of target differences in the differences, wherein the target differences are less than a preset difference threshold; and
if the number of target differences reaches a preset number threshold, determining that the to-be-detected point is valid.

Embodiment 7

The LiDAR anti-interference method according to any one of Embodiments 1 to 4, wherein the second filtering comprises:
for each to-be-detected point in the original point cloud data, obtaining at least two points in a preset direction by using the to-be-detected point as a center in the original point cloud data;
fitting the at least two points and the to-be-detected point; and
based on a fitting result, determining whether the to-be-detected point is valid,
wherein based on the fitting result, determining whether the to-be-detected point is valid comprises:
if the fitting result indicates that the at least two points and the to-be-detected point can be fitted into a straight line, determining that the to-be-detected point is valid.

Embodiment 8

A LiDAR anti-interference apparatus, comprising:
a code value determining module, configured to determine an emission code value set for each emission unit of a LiDAR, wherein each emission code value set satisfies a preset autocorrelation condition;
an emission control module, configured to, based on the emission code value set of each emission unit, control each emission unit to emit a detection beam in each emission period, to obtain original point cloud data; and
a filtering module, configured to perform first filtering and/or second filtering on the original point cloud data to obtain interference-free point cloud data.

Embodiment 9

The apparatus according to Embodiment 8, wherein the apparatus further comprises:
a determining module, configured to, when the LiDAR comprises multiple emission units, determine whether the multiple emission units comprise parallel emission units and/or serial emission units,
wherein the code value determining module is further configured to set an emission code value set for the parallel emission units and/or the serial emission units based on a preset rule.

Embodiment 10

An electronic device, comprising a memory, a processor, and a computer program stored in the memory and capable of running on the processor, wherein when the processor executes the computer program, the method according to any one of Embodiments 1 to 7 is implemented.

This application pertains to the technical field of laser detection, and in particular, to a LiDAR anti-interference method, a LiDAR anti-interference apparatus, an electronic device, and a computer-readable storage medium.

This application provides a LiDAR anti-interference method, a LiDAR anti-interference apparatus, an electronic device, and a computer-readable storage medium, which can improve detection accuracy of the LiDAR.

According to a first aspect, this application provides a LiDAR anti-interference method, including: determining an emission code value set for each emission unit of a LiDAR, where each emission code value set satisfies a preset autocorrelation condition; based on the emission code value set of each emission unit, controlling each emission unit to emit a detection beam in each emission period, to obtain original point cloud data; and performing first filtering and/or second filtering on the original point cloud data to obtain interference-free point cloud data.

According to a second aspect, this application provides a LiDAR anti-interference method, including: determining an emission code value set for each emission unit of a LiDAR, where the emission units include parallel emission units, emission code value sets of any two of the parallel emission units both satisfy the preset cross-correlation condition, and the parallel emission units refer to emission units that simultaneously perform emission in the same detection period; based on the emission code value set of each emission unit, controlling each emission unit to emit a detection beam in each emission period, to obtain original point cloud data; and performing first filtering and/or second filtering on the original point cloud data to obtain interference-free point cloud data.

According to a third aspect, this application provides a LiDAR anti-interference apparatus, including: a code value determining module, configured to determine an emission code value set for each emission unit of a LiDAR, where each emission code value set satisfies a preset autocorrelation condition; an emission control module, configured to, based on the emission code value set of each emission unit, control each emission unit to emit a detection beam in each emission period, to obtain original point cloud data; and a filtering module, configured to perform first filtering and/or second filtering on the original point cloud data to obtain interference-free point cloud data.

According to a fourth aspect, this application provides a LiDAR anti-interference apparatus, including: a code value determining module, configured to determine an emission code value set for each emission unit of a LiDAR, where the emission units include parallel emission units, emission code value sets of any two of the parallel emission units both satisfy the preset cross-correlation condition, and the parallel emission units refer to emission units that simultaneously perform emission in the same detection period; an emission control module, configured to, based on the emission code value set of each emission unit, control each emission unit to emit a detection beam in each emission period, to obtain original point cloud data; and a filtering module, configured to perform first filtering and/or second filtering on the original point cloud data to obtain interference-free point cloud data.

According to a fifth aspect, this application provides an electronic device including a memory, a processor, and a computer program stored in the memory and capable of running on the processor, where when the processor executes the computer program, steps of the method according to the first aspect and/or second aspect are implemented.

According to a sixth aspect, this application provides a computer-readable storage medium, where the computer-readable storage medium stores a computer program, and when the computer program is executed by a processor, steps of the method according to the first aspect and/or second aspect are implemented.

According to a seventh aspect, this application provides a computer program product, where the computer program product includes a computer program, and when the computer program is executed by one or more processors, steps of the method according to the first aspect and/or second aspect are implemented.

In the technical solution of this application, firstly, the emission code value set is determined for each emission unit of the LiDAR, where each emission code value set satisfies the preset autocorrelation condition. Then based on the emission code value set of each emission unit, each emission unit is controlled to emit the detection beam in each emission period, to obtain the original point cloud data. Finally, the first filtering and/or second filtering is performed on the original point cloud data to obtain the interference-free point cloud data. Therefore, the corresponding emission code value set is determined for each emission unit, and the emission code value set satisfies the preset correlation condition. In addition, filtering is performed on the original point cloud data, to remove a noise point from the original point cloud data, and finally, the interference-free point cloud data can be obtained, which can ensure that echo signal crosstalk is effectively reduced when the emission units perform emission in multiple different emission periods, to improve detection accuracy of the LiDAR. Further, the emission code is set for each emission unit in comprehensive consideration of various emission policies, filtering is also performed on the echo data, and therefore, it can be ensured that echo signal crosstalk can be controlled at a relatively low level regardless of what emission policy is used by the LiDAR to emit the detection beam, thereby further improving the detection accuracy of the LiDAR.

For the purpose of illustration rather than limitation, the following describes specific details such as a specific system structure and technology, to facilitate a thorough understanding of the embodiments of this application. However, a person skilled in the art should understand that this application can also be implemented in other embodiments without these details. In other cases, detailed descriptions of well-known systems, apparatuses, circuits, and methods are omitted, to prevent unnecessary details from causing distraction from the description of this application.

To illustrate the technical solution in this application, specific embodiments are provided herein.

Firstly, an execution body involved in the embodiments of this application is introduced. A LiDAR anti-interference method provided in the embodiments of this application may be executed by an electronic device, and the electronic device may be configured with or connected to a LiDAR. As an example, the electronic device may be a terminal device such as a mobile phone, a notebook computer, or a tablet computer; or the electronic device may alternatively be a vehicle-mounted device. This is not limited herein.

Based on the electronic device provided above, the LiDAR anti-interference method provided in the embodiments of this application is described below. The LiDAR anti-interference method specifically focuses on combination of a technical solution of individual emission performed by each individual emission unit and a technical solution of point cloud filtering. It can be understood that the individual emission herein refers to emission performed by each emission unit in different batches (that is, different emission periods).

Figure 19:
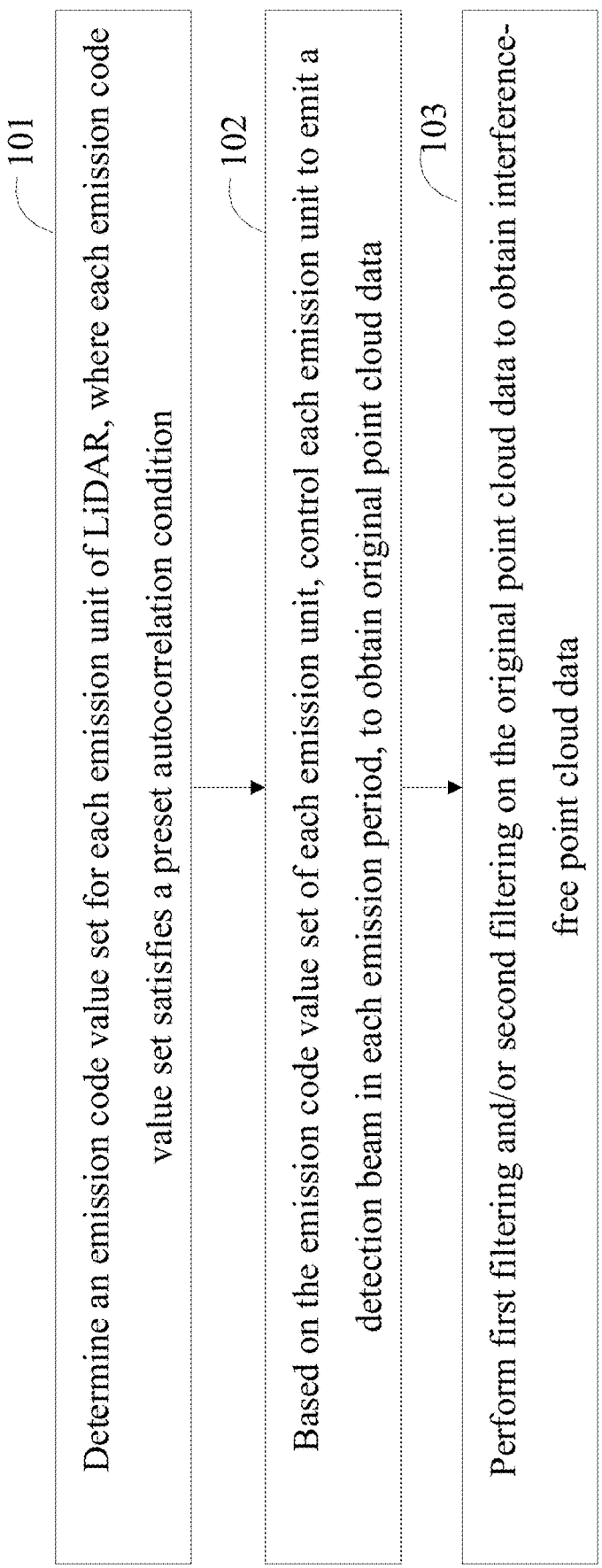
FIG. 19 is a schematic flowchart of a LiDAR anti-interference method according to an embodiment of this application.

Referring to FIG. 19, the LiDAR anti-interference method includes:

Step 101: Determine an emission code value set for each emission unit of a LiDAR, where each emission code value set satisfies a preset autocorrelation condition.

In this embodiment of this application, the LiDAR can emit a laser beam outward, that is, a detection beam. When the detection beam is reflected by an object in the environment, the LiDAR can obtain an echo signal, thereby detecting the object in the environment. In view of interference caused by the echo signal crosstalk to the LiDAR, the electronic device may set a corresponding emission code value set for each emission unit of the LiDAR.

It can be understood that for any emission unit of the LiDAR, a detection period T includes N emission periods t, that is, each emission unit performs N emissions in the detection period T. Herein, a reference moment is preset for each detection period. As an example, time differences between reference moments of adjacent transmission periods are the same. Based on a concept of the reference moment, the emission code value set is a set of emission code values, and the emission code value is used to represent time delay of the emission moment of the emission unit relative to the reference moment.

To ensure an anti-interference capability of each emission unit in an individual emission application scenario, the emission code value set of each emission unit of the LiDAR should satisfy a preset autocorrelation condition, and the autocorrelation condition is mainly to keep the autocorrelation coefficient of the emission code value set within a relatively small range, that is, to keep autocorrelation between emission code values in the same emission code value set less than a preset autocorrelation coefficient threshold.

Step 102: Based on the emission code value set of each emission unit, control each emission unit to emit a detection beam in each emission period, to obtain original point cloud data.

In this embodiment of this application, it can be learned from a characteristic of the emission code value set that each emission unit satisfies small autocorrelation at emission moments in different emissions, and therefore, interference caused by the echo signal crosstalk to the emission unit of the LiDAR in the individual emission application scenario is already diminished to some extent through step 101. The electronic device can control each emission unit to emit a detection beam in each emission period based on the corresponding emission code value set. It can be understood that, for any emission unit, because autocorrelation of the emission code value set of the emission unit is very small, the echo signal crosstalk can be avoided from an $i^{th}$ emission to an $(i+1)^{th}$ emission of the emission unit.

By repeatedly performing steps 101 and 102 in each detection period, the electronic device can obtain point cloud data corresponding to the environment in which the LiDAR is located. Because the point cloud data is further processed subsequently, to facilitate differentiation, the point cloud data obtained through the LiDAR is referred to as the original point cloud data herein.

Step 103: Perform first filtering and/or second filtering on the original point cloud data to obtain interference-free point cloud data.

In this embodiment of this application, two filtering methods are proposed, namely, the first filtering and the second filtering respectively. It can be understood that for any to-be-detected point in the original point cloud data, as long as the to-be-detected point is determined to be valid in any filtering method, the to-be-detected point can be retained; otherwise, if the to-be-detected point is determined to be invalid in both the filtering methods, it is believed that the to-be-detected point is a noise point, and the to-be-detected point needs to be eliminated.

To avoid a waste of resources and improve efficiency of filtering, the to-be-detected point can be first detected in one filtering method (that is, the first filtering). If the to-be-detected point is determined to be valid through the first filtering, the to-be-detected point is retained, and there is no need to perform another filtering on the to-be-detected point. Otherwise, if the to-be-detected point is determined to be invalid through the first filtering, the to-be-detected point needs to be detected in another filtering method (that is, the second filtering). If the to-be-detected point is determined to be valid through the second filtering, the to-be-detected point is retained. Otherwise, if the to-be-detected point is still determined to be invalid through the second filtering, the to-be-detected point is finally determined to be definitely invalid, and the to-be-detected point can be eliminated from the original point cloud data.

In some embodiments, the emission code value set satisfying the autocorrelation condition can be determined in the following manner.

A1. A linear feedback shift register generates at least two pseudorandom sequences.

Based on a definition of the linear feedback shift register, it can be learned that there should be at least one input sequence. The input sequence can be set by the electronic device based on an actual need. This is not limited herein. In consideration that this embodiment of this application aims to reduce crosstalk of different batches of echo signals of the emission units, as an example, values in the input sequence may be different from each other. At least two pseudorandom sequences can be generated through continuous feedback and re-input of the linear feedback shift register.

A2. Calculate an autocorrelation function of each pseudorandom sequence, to obtain an autocorrelation coefficient of each pseudorandom sequence.

The electronic device can first calculate an autocorrelation function of each pseudorandom sequence, to obtain an autocorrelation coefficient of each pseudorandom sequence. Specifically, the autocorrelation function can be obtained based on the following formula:

$$\text{ACF}(a, \tau) = \Sigma_{i=1}^{P} a_i a_{i+\tau}$$

Herein, ACF(a, $\tau$) is the autocorrelation function, $a_i$ represents an $i^{th}$ pseudorandom sequence, and $\tau$ is preset time offset.

A3. Screen out a pseudorandom sequence whose autocorrelation coefficient satisfies a preset autocorrelation condition, and determine an emission code value set based on the pseudorandom sequence that is screened out.

It can be learned from the foregoing description that the autocorrelation condition is mainly intended to screen out pseudorandom sequences with a minimum autocorrelation function, to reduce possibility of crosstalk of echo signals during individual emission. As an example, an autocorrelation coefficient threshold can be preset, and then the autocorrelation coefficient of each pseudorandom sequence can be compared with the autocorrelation coefficient threshold, to screen out the pseudorandom sequence whose autocorrelation coefficient is less than the autocorrelation coefficient threshold; or based on the autocorrelation coefficient of each pseudorandom sequence, several previous pseudorandom sequences with the minimum autocorrelation coefficient can be screened out directly. A screening method is not limited herein. Therefore, the electronic device can determine an emission code value set for each emission unit based on the pseudorandom sequences that are screened out.

In some embodiments, one detection period includes N emission periods, and one emission code value set includes M emission code values, and N may be greater than M. In this case, when step 102 is performed, K adjacent emissions may be preset, and then for each emission unit, provided that an $i^{th}$ emission and a $j^{th}$ emission of the emission unit within the detection period satisfy that $j-i \geq K$, the $j^{th}$ emission and the $i^{th}$ emission may correspond to the same emission code value. That is, for the emission code value set of any emission unit, the emission code value in the emission code value set can be reused, but it should be noted that, if the emission code value is reused, a time interval between two corresponding emission periods should be greater than preset duration, that is, the time interval is sufficient. In this way, a problem of insufficient analysis zone can be effectively solved, and a coding burden of the electronic device can be also reduced.

An example is provided below to better understand the solution for the individual emission application scenario proposed in this embodiment of this application.

In an application scenario, the LiDAR may be a mechanical LiDAR. Usually, the mechanical LiDAR has multiple emission boards, and each emission board has multiple emission units. A working principle of the mechanical LiDAR is as follows. A motor drives an optical-mechanical system to rotate, so that each emission unit can rotate by a preset angle, for example, 360 degrees; and each time the LiDAR completely scans by a preset angle, that is, scanning in one detection period is completed. Based on the technical solution for the individual emission application scenario proposed above, it can be learned that for the mechanical LiDAR, when performing one emission, each emission unit has a corresponding emission code value, and the emission code value is a delay value of the emission moment relative to the reference moment. It can be understood that, for the mechanical LiDAR, one emission unit should correspond to different emission code values during preset adjacent emissions and the reference moment. Herein, the K preset adjacent emissions are related to emission frequency and a rotational speed of the mechanical LiDAR. In addition, to further reduce the echo signal crosstalk in the individual emission application scenario of the mechanical LiDAR, an autocorrelation coefficient of the emission code value of the emission unit within one detection period is less than an autocorrelation coefficient threshold.

As an example, assuming that the mechanical LiDAR has a total of L emission boards, each emission board has O emission units corresponding to a detection period T, any emission unit completes N emissions within one detection period T, an emission code value set of each emission unit includes M emission code values, and each emission code value set satisfies an autocorrelation condition, that is, the autocorrelation coefficient is less than the autocorrelation coefficient threshold.

As an exemplary embodiment, assuming that $M \geq N$, for any emission unit, when the emission unit emits a detection beam in any emission period (for example, a $K^{th}$ emission period), only one emission code value needs to be randomly selected from a corresponding emission code value set of the emission unit (herein, the emission code value is different from emission code values corresponding to previous K−1 emission periods). In this way, the N emissions of the emission unit in the detection period correspond to N different emission code values, and autocorrelation coefficients of the N emission code values are very small.

As another exemplary embodiment, assuming that M<N, when any emission unit emits detection beams from an $i^{th}$ emission period to an $(i+K-1)^{th}$ emission period, emission code values extracted from the emission code value set should be different from each other, and K is the number of preset adjacent emissions proposed above. However, the $i^{th}$ emission period and the $(i+K)^{th}$ emission period can correspond to the same emission code value. For example, assuming that K is 48, a $1^{st}$ emission to a $48^{th}$ emission of the emission unit all correspond to different emission code values in the emission code value set; the $1^{st}$ emission and a $49^{th}$ emission can correspond to the same emission code value in the emission code value set; similarly, a $2^{nd}$ emission and a $50^{th}$ emission can also correspond to the same emission code value in the emission code value set, and so on. It can be understood that the maximum value of K is M, that is, the maximum value of K is the number of emission code values included in the emission code value set.

Figure 20:
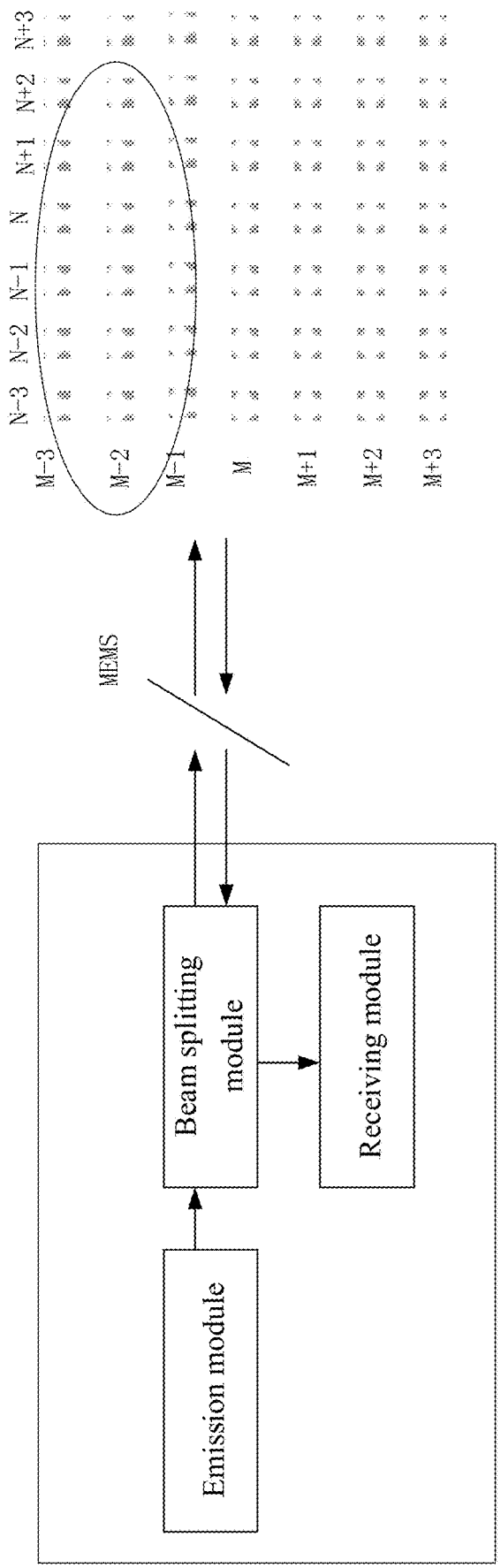
FIG. 20 is a schematic diagram of a working principle of a MEMS LiDAR according to an embodiment of this application.

In another application scenario, the LiDAR is a Micro-Electro-Mechanical System (MEMS) LiDAR. The MEMS LiDAR usually has multiple emission units. In a typical scenario, positions of the multiple emission units are aligned. As an example, multiple emission units splice multiple detection fields of view through a scanning optical element, such as a two-dimensional galvanometer. This application imposes no limitation on the number of emission units, an arrangement of the emission units, and the number of scanning optical elements. FIG. 20 shows an example of a working principle of a MEMS LiDAR. The emission module includes multiple emission units, the receiving module includes multiple receiving units, and an emission unit in the emission module uses the two-dimensional galvanometer to scan, to detect a point cloud corresponding to a detection field of view in the environmental, for example, a point cloud shown on the right side of FIG. 20.

As an example, assuming that the MEMS LiDAR has a total of L emission units and a detection period T, any emission unit completes N emissions within one detection period T, an emission code value set of each emission unit includes M emission code values, and each emission code value set satisfies an autocorrelation condition, that is, the autocorrelation coefficient is less than the autocorrelation coefficient threshold.

Assuming that $M \geq N$, when any emission unit, the emission unit emits the detection beam in each emission period in a detection period, only one emission code value that has not been extracted in the detection period needs to be randomly extracted. In this way, the N emissions of the emission unit in the detection period correspond to N different emission code values, and autocorrelation coefficients of the N emission code values are very small.

Assuming that M<N, when any emission unit emits detection beams from an $i^{th}$ emission period to an $(i+K-1)^{th}$ emission period in one detection period, emission code values extracted from the emission code value set should be different from each other, and K is the number of preset adjacent emissions proposed above. However, the $i^{th}$ emission period and the $(i+k)^{th}$ emission period can correspond to the same emission code value.

Figure 21:
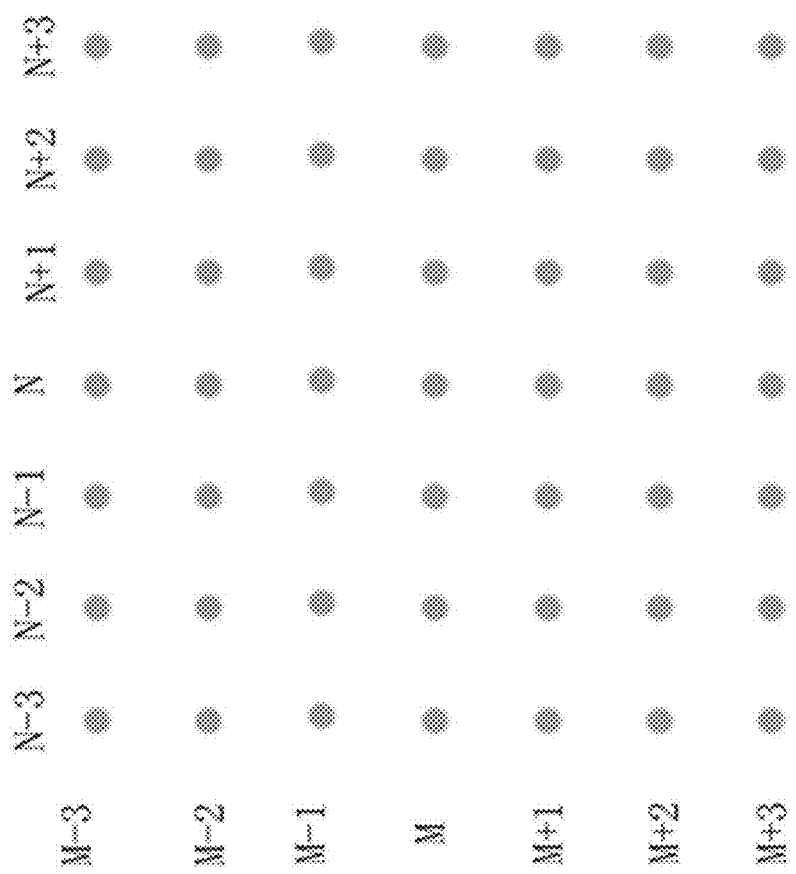
FIG. 21 is a diagram of an exemplary plane of a point cloud correspondingly obtained by an emission unit of a MEMS LiDAR according to an embodiment of this application.

For ease of understanding, refer to FIG. 21. FIG. 21 shows an example of a point cloud obtained by one emission unit through multiple emissions. It can be learned from FIG. 21 that an interval between points obtained during the preset adjacent emissions is relatively small, and therefore, if emissions are performed by using the same emission code value during the preset adjacent emissions (for example, the same emission code value is used during a first emission and a second emission in the detection period), specific echo signal crosstalk may be caused. However, provided that the two emissions are spaced by emissions exceeding the preset adjacent emissions, even if the same emission code value is used for the two emissions, no excessive echo signal crosstalk is caused. For example, because a point, obtained by the emission unit through the first emission, in an $(M-3)^{th}$ row and an $(N-3)^{th}$ column in FIG. 21 is farther spaced from a point, obtained through a $49^{th}$ emission, in an $(M+3)^{th}$ row and an $(N+3)^{th}$ column in FIG. 21, and an interval between emission periods is also large, the same emission code value may be used for the first emission and the $49^{th}$ emission, thereby reusing an element in the emission code value set.

Based on this concept, when there are not sufficient analysis regions in application of high-frequency, long-distance ranging, the electronic device can ensure that emission code values of the preset adjacent emissions are not repeated during designing of a code period, so that the maximum delay of the emission moment corresponding to each emission relative to the reference moment is minimized to the maximum extent while ensuring an autocorrelation coefficient of the code is relatively small, thereby solving the problem of insufficient analysis regions in the application of high-frequency, long-distance ranging.

In another application scenario, the LiDAR is an array LiDAR (flash LiDAR). The flash LiDAR is equipped with an emission array and a receiving array. The emission array includes multiple emission units, and correspondingly, the receiving array includes multiple receiving units. Similarly, the autocorrelation condition is set, so that the emission code value set of any emission unit in the emission array satisfies small autocorrelation, and therefore, when the emission unit performs individual emission (that is, the emission unit performs emissions in multiple different emission periods), echo signal crosstalk is not caused. Certainly, for each emission unit in the flash LiDAR, to solve the problem of insufficient analysis regions, reuse of the emission code value in the emission code value set can also be determined based on the preset adjacent emissions. That is, for any emission unit, an $i^{th}$ emission period and an $(i+K)^{th}$ emission period can correspond to the same emission code value, where a value of K is related to emission frequency of the emission unit and a target detection distance set by the LiDAR. For details, refer to the foregoing descriptions. Details are not described herein again.

Another LiDAR anti-interference method provided in the embodiments of this application is described below. This LiDAR anti-interference method is mainly applied when there are parallel emission units in the LiDAR, and a technical solution of performing parallel emission control on the emission units is combined with a technical solution of point cloud filtering to solve the problem of interference to the LiDAR. It can be understood that the parallel emission units are emission units that simultaneously perform emission in the same detection period.

Figure 22:
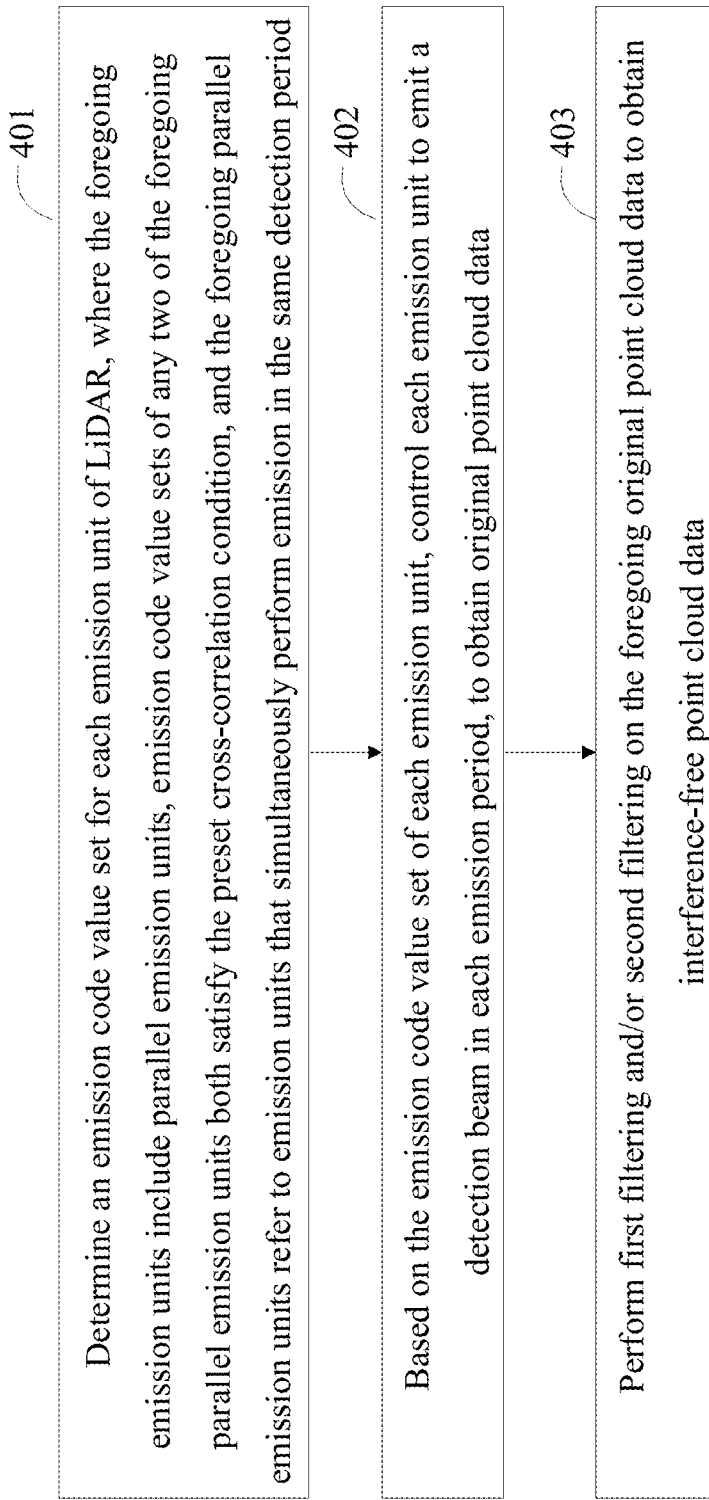
FIG. 22 is a schematic flowchart of a LiDAR anti-interference method according to an embodiment of this application.

Referring to FIG. 22, the LiDAR anti-interference method includes:

Step 401. Determine an emission code value set for each emission unit of a LiDAR, where the emission units include parallel emission units, emission code value sets of any two of the parallel emission units both satisfy the preset cross-correlation condition, and the parallel emission units refer to emission units that simultaneously perform emission in the same detection period.

For ease of understanding, a simple instance is firstly used to explain a meaning of the parallel emission units. For example, in one emission period, from a microscopic perspective, an emission unit A actually emits a detection beam at a moment $T_0+x_1$, an emission unit B actually emits a detection beam at a moment $T_0+x_2$, and an emission unit C actually emits a detection beam at a moment $T_0+x_3$. Differences among the three moments are very small, and $x_1$, $x_2$, and $x_3$ can also be negative numbers; that is, emission intervals of the three emission units in the same emission period are very short, and the three emission moments are all very close to the moment $T_0$. Therefore, the emission units A, B, and C can be approximately considered to emit the detection beams at the moment $T_0$.

It can be understood that, in a parallel emission scenario, the emission units of the LiDAR can usually be divided into multiple groups of parallel emission units. For example, emission units A, B, and C are a group of parallel emission units, and emission units D, E, and F are another group of parallel emission units. That is, the emission units A, B, and C approximately simultaneously perform emission, and the emission units D, E, and F approximately simultaneously perform emission, but the emission units A, B, and C and the emission units D, E, and F do not approximately simultaneously perform emission. Any two parallel emission units mentioned in this application refer to any two parallel emission units in the same group.

For any two parallel emission units, emission code value sets of these two parallel emission units should satisfy the preset cross-correlation condition. The cross-correlation condition is mainly intended to keep cross-correlation coefficients of different emission code value sets within a relatively small range, that is, to ensure that the cross-correlation coefficients of different emission code value sets are less than the preset cross-correlation coefficient threshold. For example, in the example described above, any two of the emission code value sets of the emission units A, B, and C satisfy the cross-correlation condition, so that cross-correlation at the emission moment is relatively small even though the emission units A, B, and C approximately simultaneously perform emission, thereby avoiding echo signal crosstalk between the parallel emission units.

Step 402: Based on the emission code value set of each emission unit, control each emission unit to emit a detection beam in each emission period, to obtain original point cloud data.

In this embodiment of this application, it can be learned from a characteristic of the emission code value set that for any two parallel emission units, relatively small cross-correlation is satisfied at the emission moment in the same emission, and therefore, interference caused by the echo signal crosstalk to the LiDAR in the parallel emission application scenario is already diminished to some extent through step 401. The electronic device can control each emission unit to emit a detection beam in each identical emission period based on the corresponding emission code value set.

Step 403: Perform first filtering and/or second filtering on the original point cloud data to obtain interference-free point cloud data.

It can be understood that step 403 is the same as or similar to step 103. For details, refer to the related description of step 103. Details are not described herein.

In some embodiments, the emission code value set satisfying the cross-correlation condition can be determined in the following manner.

B1. A linear feedback shift register generates at least two pseudorandom sequences.

This step is the same as or similar to step A1. For details, refer to the related description of step A1. Details are not described herein.

B2. Calculate a cross-correlation function of any two pseudorandom sequences, to obtain a cross-correlation coefficient of the any two pseudorandom sequences.

The electronic device can first calculate a cross-correlation function of each pseudorandom sequence, to obtain a cross-correlation coefficient of each pseudorandom sequence. Specifically, the cross-correlation function can be obtained based on the following formula:

$$CCF(a, b, \tau) = \Sigma_{i=1}^{P} a_i b_{i+\tau}$$

Herein, $a_i$ is a pseudorandom sequence, $b_{i+\tau}$ is another pseudorandom sequence, $CCF(a, b, \tau)$ is a cross-correlation function of the pseudorandom sequences $a_i$ and $b_{i+\tau}$, and $\tau$ is preset time offset.

B3. Screen out a pseudorandom sequence whose cross-correlation coefficient satisfies a preset cross-correlation condition, and determine an emission code value set based on the pseudorandom sequence that is screened out.

It can be learned from the foregoing description that the cross-correlation condition is mainly intended to screen out pseudorandom sequences with minimum cross-correlation, to reduce possibility of crosstalk of echo signals during parallel emission. As an example, a cross-correlation coefficient threshold can be preset, and cross-correlation coefficients of any two pseudorandom sequences can be compared with the cross-correlation coefficient threshold, to screen out multiple pseudorandom sequences whose cross-correlation coefficients are less than the cross-correlation coefficient threshold. A screening method is not limited herein. Therefore, the electronic device can determine an emission code value set for each parallel emission unit based on the pseudorandom sequences that are screened out. For example, three pseudorandom sequences S1, S2, and S3 are obtained through steps B1 to B3, cross-correlation between any two of the three pseudorandom sequences is relatively small, and in this way, an emission code value set of an emission unit A can be determined based on S1, an emission code value set of an emission unit B can be determined based on S2, and an emission code value set of an emission unit C can be determined based on S3.

An example is provided below to better understand the solution for the parallel emission application scenario proposed in this embodiment of this application.

In an application scenario, the LiDAR may be a mechanical LiDAR. Some related concepts of the LiDAR are already described in the previous embodiments, and therefore, the LiDAR is not limited herein. FIG. 23 shows an example of a structure of a mechanical LiDAR. 100 refers to an emission lens of the emission unit, and 200 refers to an emission board. Usually, it can be considered that there are parallel emission units on different emission boards. As an example, emission units in the same row on different emission boards may be parallel emission units.

As an example, the first emission unit on the first emission board is denoted as an emission unit A, the first emission unit on the second emission board is denoted as an emission unit B, and therefore, based on the determined solution of the emission code value set proposed above, it can be learned that cross-correlation of an emission code value set of the emission unit A and an emission code value set of the emission unit B needs to be less than a preset cross-correlation threshold. Therefore, it can be learned that during detection in one detection period, because emission code values of the emission unit A and the emission unit B have relatively small cross-correlation, no mutual crosstalk occurs between the emission unit A and the emission unit B during multiple emissions in the detection period. By analogy, each time parallel emission units in each row approximately simultaneously perform emission (that is, during each parallel emission), because a condition that cross-correlation of corresponding emission code value sets is less than the preset cross-correlation threshold is satisfied, no echo signal crosstalk is caused between the parallel emission units. As an example, the point cloud shown on the left side of FIG. 23 can be obtained through parallel emission operations of parallel emission units in each row within one emission period.

In another application scenario, the LiDAR is a MEMS LiDAR. Some related concepts of the LiDAR are already described in the previous embodiments, and therefore, the LiDAR is not limited herein. As an example, all emission units of the MEMS LiDAR can be considered as a group of parallel emission units. That is, all the emission units of the MEMS LiDAR can approximately simultaneously perform emission within the same emission period. Because emission code value sets corresponding to any two emission units satisfy a cross-correlation condition, no echo signal crosstalk occurs between different emission units (especially, between adjacent emission units).

Figure 26:
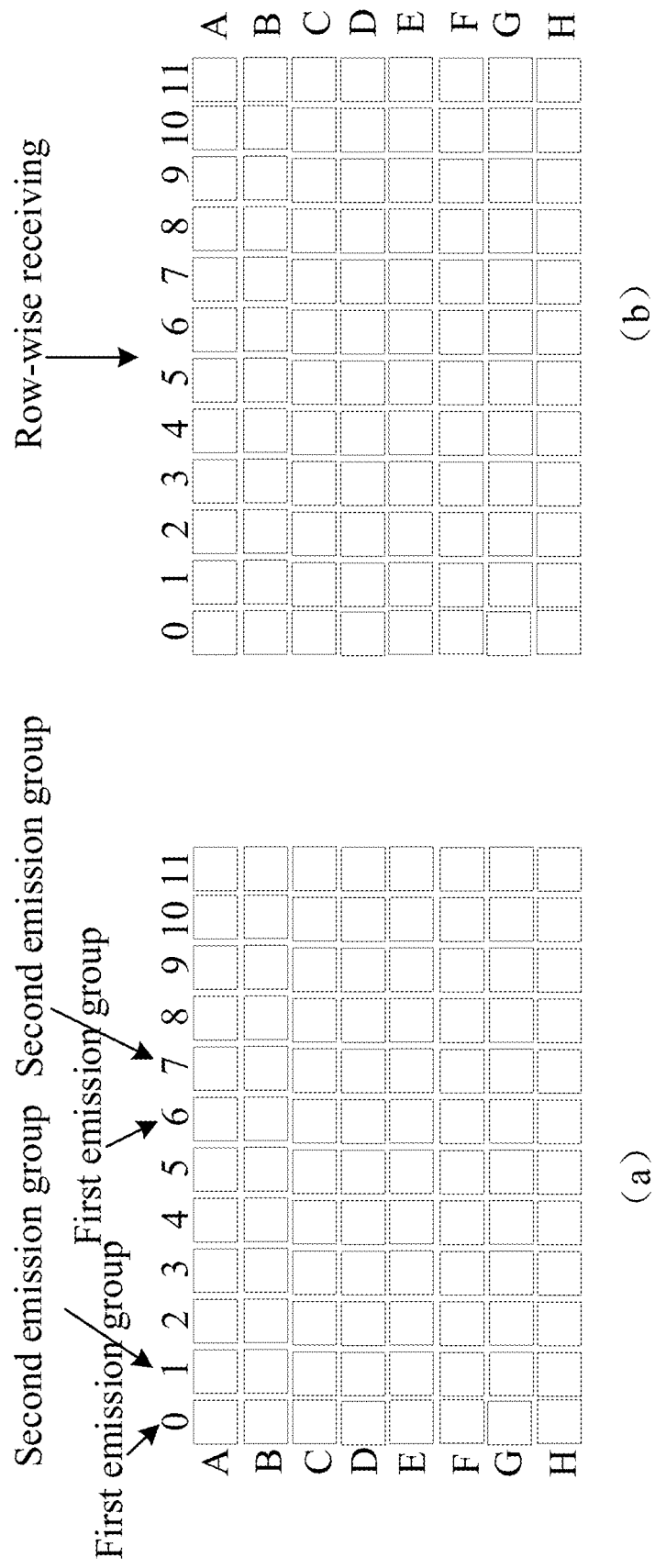
FIG. 26 is a diagram of an exemplary emission array and receiving array of a flash LiDAR in a serial emission scenario according to an embodiment of this application.

In another application scenario, the LiDAR is a solid-state LiDAR (flash LiDAR). The flash LiDAR is equipped with an emission array and a receiving array. Some related concepts of the LiDAR are already described in the previous embodiments, and therefore, the LiDAR is not limited herein. As an example, as shown in FIG. 26, in one receiving period, a whole row (column) of receiving units in the receiving array usually receive echo beams. In the flash LiDAR, for each row (column), two or more emission units spaced by some positions in the row (column) can be considered as an emission group; and for each column (row), two or more emission units spaced by some positions in the column (row) can be considered as parallel emission units.

Figure 24:
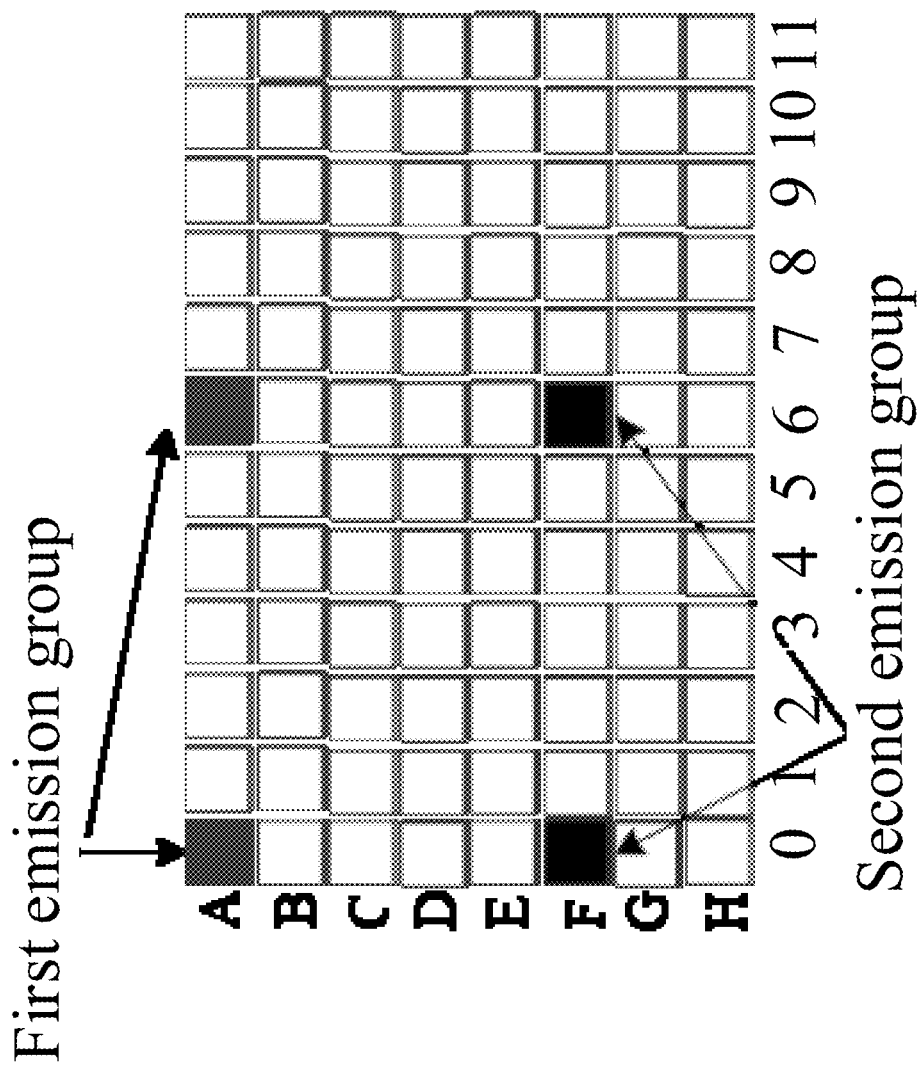
FIG. 24 is a diagram of an exemplary emission array of a flash LiDAR in a parallel emission scenario according to an embodiment of this application.

FIG. 24 shows an example of a LiDAR in a parallel emission application scenario. In FIG. 24, two emission units $A_0$ and $A_6$ in the same row that are at physical positions satisfying a condition of no optical non-crosstalk are used as an emission group, denoted as the first emission group. Two corresponding emission units $F_0$ and $F_6$ in different columns that are at physical positions satisfying a condition of no optical non-crosstalk are used as an emission group, denoted as the second emission group. The first emission group and the second emission group are parallel emission units. That is, the emission units $A_0$ and $F_0$ approximately simultaneously perform emission in each same emission period, and emission code value sets of the two emission units satisfy the cross-correlation condition; and the emission units $A_6$ and $F_6$ approximately simultaneously perform emission in each same emission period, and emission code value sets of the two emission units satisfy the cross-correlation condition.

It should be noted that at least two different emission units in an emission group can emit laser beams at different time based on a preset rule. Specifically, taking FIG. 24 as an example for description, for the first emission group, the emission unit $A_0$ emits a laser beam first, and the emission unit $A_6$ emits a laser beam after the emission unit $A_0$. Similarly, for the second emission group, the emission unit $F_0$ emits a laser beam first, and the emission unit $F_6$ emits a laser beam after the emission unit $F_0$. It can be understood that a specific emission sequence of each emission group is not exclusively limited in this application. It can be learned that, for the flash LiDAR, in the LiDAR anti-interference solution proposed in this embodiment of this application, echo signal crosstalk caused due to simultaneous emission can be avoided, and a processing frame rate can also be increased.

Another LiDAR anti-interference method provided in the embodiments of this application is described below. The LiDAR anti-interference method specifically focuses on combination of a technical solution of serial emission performed by the emission unit and a technical solution of point cloud filtering. It can be understood that the serial emission units refer to emission units that sequentially perform emission based on preset timing in the same detection period.

Figure 25:
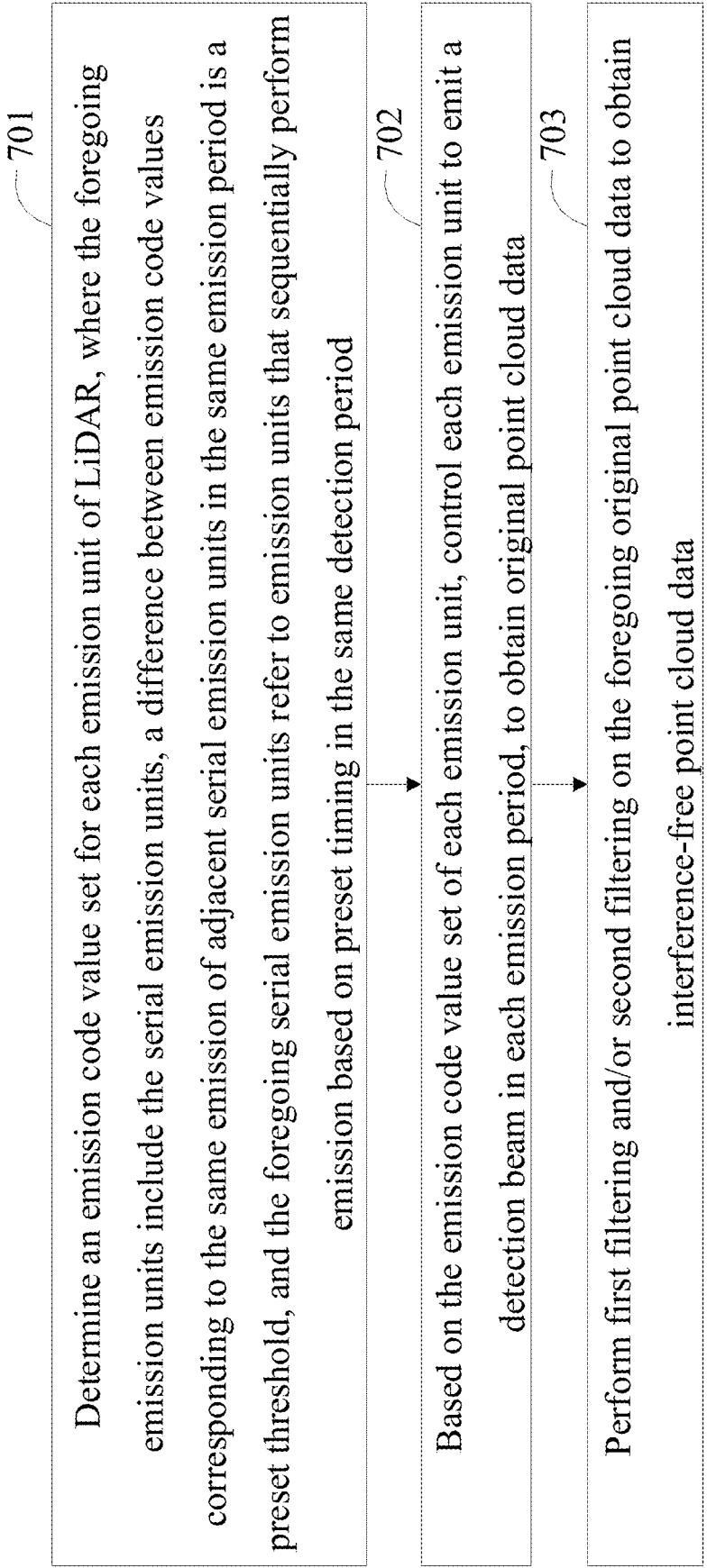
FIG. 25 is a schematic flowchart of a LiDAR anti-interference method according to an embodiment of this application.

Referring to FIG. 25, the LiDAR anti-interference method includes:

Step 701: Determine an emission code value set for each emission unit of a LiDAR, where the emission units include the serial emission units, a difference between emission code values corresponding to the same emission of adjacent serial emission units in the same emission period is a preset threshold, and the serial emission units refer to emission units that sequentially perform emission based on preset timing in the same detection period.

For ease of understanding, a meaning of the serial emission units is first explained with a simple instance. For example, in the LiDAR, positions of emission units A, B, and C are adjacent. In one emission period, the emission unit A first emits a detection beam, and when an echo signal of the detection beam can be certainly received, the emission unit B emits a detection beam, and by analogy, then the emission unit C emits a detection beam.

The preset threshold can be determined based on the farthest detection distance d designed for the LiDAR and a transmission velocity v (that is, a speed of light) of the detection beam. Specifically, longest receiving duration of the echo signal can be calculated based on a formula $$t_{max} = \frac{2d}{v}.$$

When the preset threshold is a fixed value, based on the longest receiving duration $t_{max}$, the preset threshold can be set to indicate a difference between the code values of the two serial emission units, that is, the difference between the code values of the two serial emission units is a fixed code value greater than the longest receiving duration $t_{max}$, so that emission interval duration of two adjacent serial emission units is a fixed value greater than the longest receiving duration $t_{max}$; or when the preset threshold is a variable, based on the longest receiving duration $t_{max}$, the preset threshold can be set to indicate a difference between the code values of the two serial emission units, that is, the difference between the code values of the two serial emission units is a variable code value greater than the longest receiving duration $t_{max}$, so that emission interval duration of two adjacent serial emission units is a variable greater than the longest receiving duration $t_{max}$.

Step 702: Based on the emission code value set of each emission unit, control each emission unit to emit a detection beam in each emission period, to obtain original point cloud data.

In this embodiment of this application, because a difference between emission code values corresponding to the same emission of adjacent serial emission units in the same emission period is defined as the preset threshold, when each emission unit is controlled to perform emission in each emission period, it can be ensured that no echo signal crosstalk affects the serial emission unit.

Step 703: Perform first filtering and/or second filtering on the original point cloud data to obtain interference-free point cloud data.

It can be understood that step 703 is the same as or similar to step 103. For details, refer to the related description of step 103. Details are not described herein.

An example is provided below to better understand the solution for the serial application scenario proposed in this embodiment of this application.

In an application scenario, the LiDAR may be a mechanical LiDAR. Some related concepts of the LiDAR are already described in the previous embodiments, and therefore, the LiDAR is not limited herein. For the LiDAR, the emission units on the same emission board can generally be considered as serial emission units, and in general, for one emission board, emission usually starts sequentially from the first emission unit.

As an example, the first emission unit on the first emission board is denoted as an emission unit A, the second emission unit on the first emission board is denoted as an emission unit B, and the third emission unit on the first emission board is denoted as an emission unit C. Based on the determined solution of the emission code value set proposed above, it can be learned that, in the assumed same emission period, the emission unit A can randomly select an emission code value from the emission code value set, to perform emission at a moment T1.

When the preset threshold is the fixed value, assuming that the duration corresponding to the preset threshold is $T_0$, and $T_0$ is greater than the longest receiving duration $t_{max}$, the emission unit B performs emission at a moment $T_1+T_0$; and correspondingly, the emission unit C performs emission at a moment $T_1+2*T_0$. n this way, the emission units A, B, and C sequentially perform emission based on the fixed duration within the same emission period.

When the preset threshold is a variable, the emission unit B performs emission at a moment $T_1+T_1'$, where $T_1'$ is duration corresponding to a possible value of the preset threshold. The emission unit C performs emission at a moment $T_1+T_1'+T_1''$, where $T_1''$ is duration corresponding to another possible value of the preset threshold, and both $T_1'$ and $T_1''$ are greater than the longest receiving duration $t_{max}$. In this way, the emission units A, B, and C sequentially perform emission based on the variable duration within the same emission period.

In another application scenario, the LiDAR is a MEMS LiDAR. Some related concepts of the LiDAR are already described in the previous embodiments, and therefore, the LiDAR is not limited herein. When the MEMS LiDAR performs detection in a short-range scenario, all emission units of the MEMS LiDAR can be considered as a group of serial emission units. That is, all the emission units of the MEMS LiDAR can perform serial emission within the same emission period. Similar to the foregoing mechanical LiDAR, during serial emission, if the preset threshold is a fixed value, the emission units of the MEMS LiDAR can sequentially perform emission based on their position arrangements in fixed duration; or if the preset threshold is a variable, the emission units of the MEMS LiDAR can sequentially perform emission based on their position arrangements in variable duration.

In another application scenario, the LiDAR is an array LiDAR (flash LiDAR). The flash LiDAR is equipped with an emission array and a receiving array. Some related concepts of the LiDAR are already described in the previous embodiments, and therefore, the LiDAR is not limited herein. As described above, two different emission units in one emission group perform serial emission. Details are not described herein. In addition, multiple emission groups can also be set in the same row (column).

In FIG. 26, emission units $A_0$ and $A_6$ are in one emission group, denoted as the first emission group; emission units $A_1$ and $A_7$ are in one emission group, denoted as the second emission group; and the emission units $A_0$, $A_1$, $A_6$, and $A_7$ are all in the same row. Different emission groups in the same row also follow a serial emission principle. That is, in the first row, after the first emission group including the emission units $A_0$ and $A_6$ complete emission, the second emission group including the emission units $A_1$ and $A_7$ further perform emission, and so on, followed by emission units $A_2$ and $A_8$ and then emission units $A_3$ and $A_9$. Details are not described herein.

It can be understood that, for the flash LiDAR, it can be learned from the foregoing application scenarios of serial emission and parallel emission that, different emission groups in the same row can be considered to perform serial emission, and different emission groups in the same column can be considered to perform parallel emission; or different emission groups in the same column can be considered to perform serial emission, and different emission groups in the same row can be considered to perform parallel emission. As an example, with reference to the parallel emission scenario corresponding to FIG. 24 and the serial transmission scenario corresponding to FIG. 26, it can be determined that, within one emission period, the emission group including the emission units $A_0$ and $A_6$ and the emission group including the emission units $F_0$ and $F_6$ perform parallel emission. Then the emission group including the emission units $A_0$ and $A_6$ and the emission group including the emission units $F_1$ and $F_7$ perform serial emission; and correspondingly, the emission group including the emission units $F_0$ and $F_6$ and the emission group including the emission units $F_1$ and $F_7$ perform serial emission. In addition, emission units in each emission group also perform serial emission.

In some embodiments, in real-world applications of the LiDAR, the foregoing individual emission application scenario, parallel emission application scenario, and serial emission application scenario are usually used in combination. For example, for the mechanical LiDAR, multiple emissions of any emission unit actually belong to the individual emission application scenario. For the emission units in the same row on different emission boards, concurrent emission operations in the same emission period actually belong to the parallel emission application scenario. For the emission units on the same emission board, concurrent emission operations in the same emission period actually belong to the serial emission application scenario. It can be understood that, in actual applications, for a LiDAR system, the individual emission application scenario, the parallel emission application scenario, and the serial emission application scenario may all exist.

Figure 27:
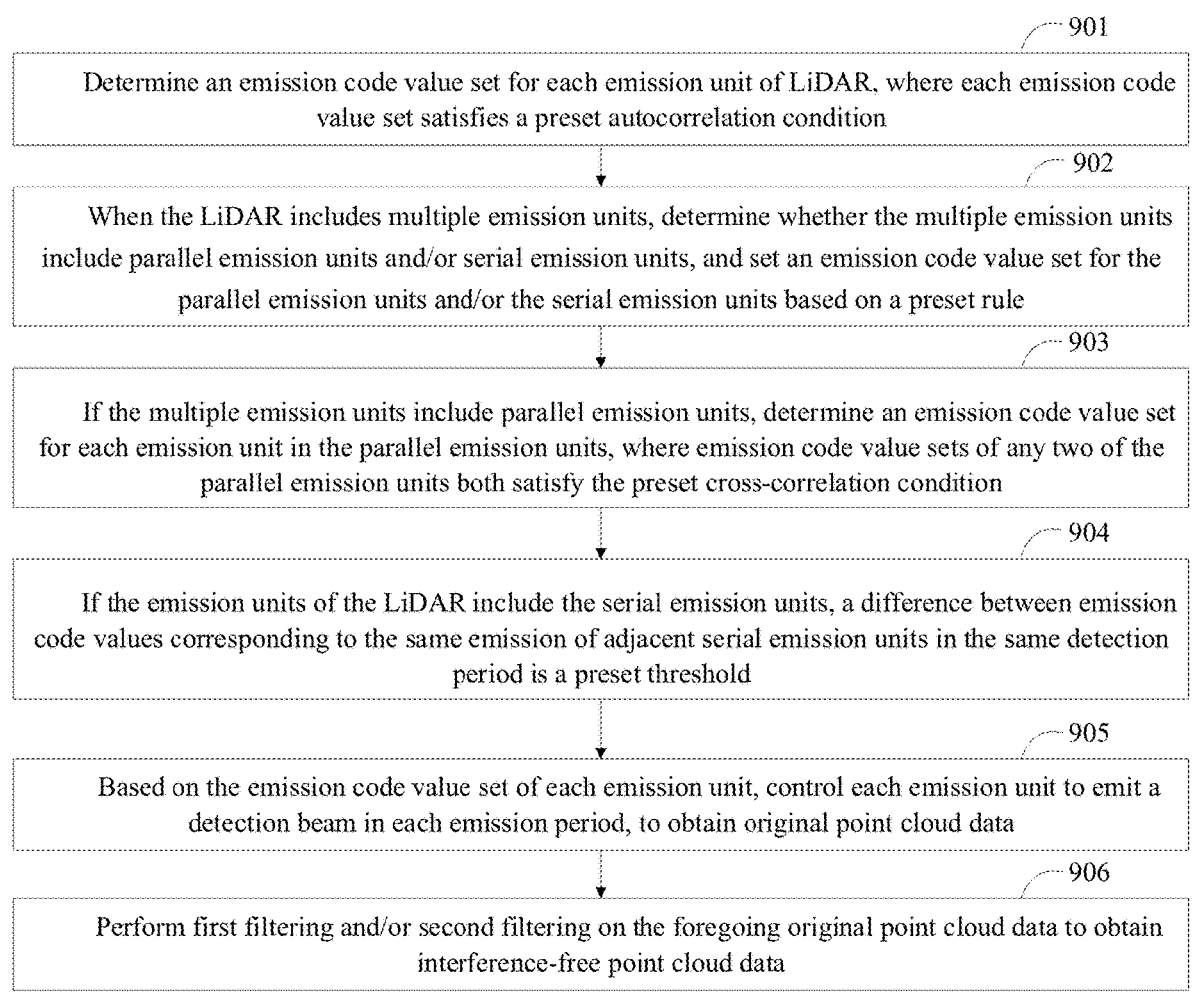
FIG. 27 is a schematic flowchart of a LiDAR anti-interference method according to an embodiment of this application.

Another LiDAR anti-interference method provided in the embodiments of this application is described below. FIG. 27 shows a LiDAR anti-interference method. The LiDAR anti-interference method includes:

Step 901: Determine an emission code value set for each emission unit of a LiDAR, where each emission code value set satisfies a preset autocorrelation condition.

Step 902: When the LiDAR includes multiple emission units, determine whether the multiple emission units include parallel emission units and/or serial emission units, and set an emission code value set for the parallel emission units and/or the serial emission units based on a preset rule.

Step 903: If the multiple emission units include parallel emission units, determine an emission code value set for each emission unit in the parallel emission units, where emission code value sets of any two of the parallel emission units both satisfy the preset cross-correlation condition. The parallel emission units refer to emission units that simultaneously perform emission in the same detection period.

Step 904: If the emission units of the LiDAR include the serial emission units, a difference between emission code values corresponding to the same emission of adjacent serial emission units in the same detection period is a preset threshold. The serial emission units refer to emission units that sequentially perform emission based on preset timing in the same detection period.

Step 905: Based on the emission code value set of each emission unit, control each emission unit to emit a detection beam in each emission period, to obtain original point cloud data.

Step 906: Perform first filtering and/or second filtering on the original point cloud data to obtain interference-free point cloud data.

It can be learned from the above description that, for the LiDAR, in the individual emission application scenario, an emission code value set corresponding to each emission unit can be determined based on the autocorrelation condition. In the parallel emission application scenario, an emission code value set corresponding to each emission unit can be determined based on the cross-correlation condition. For both the individual emission application scenario and the parallel emission application scenario, an emission code value set corresponding to each emission unit can be determined based on the autocorrelation condition and the cross-correlation condition. In addition, in a serial emission application scenario, a difference between emission code values corresponding to the same emission of adjacent serial emission units in the same detection period can be set to a preset threshold. The emission code is set for each emission unit in comprehensive consideration of various emission policies, and therefore, it can be ensured that echo signal crosstalk can be controlled at a relatively low level regardless of what emission policy is used by the LiDAR to emit the detection beam, thereby further improving the detection accuracy of the LiDAR.

Any to-be-detected point in the original data cloud data is used as an example below to describe a specific procedure of performing first filtering and/or second filtering on the original point cloud data to obtain interference-free point cloud data.

In some embodiments, for any to-be-detected point in the original point cloud data, a detailed procedure of the first filtering is as follows.

C1. Determine a to-be-detected neighborhood centered on the to-be-detected point based on a preset neighborhood size.

C2. Calculate a difference between a ranging value of each point in the to-be-detected neighborhood other than the to-be-detected point and a ranging value of the to-be-detected point.

Usually, in point cloud obtained based on a target perpendicular to a surface and a 0-degree (horizontal or vertical) direction of the LiDAR, a difference between ranging values of points is relatively small. Based on this, from this perspective, the difference between the ranging value of each point in the to-be-detected neighborhood other than the to-be-detected point and the ranging value of the to-bedetected point is calculated. A neighborhood size is denoted as M*N. It can be understood that in an M*N neighborhood, there are M*N−1 points in addition to the to-be-detected point. Differences between ranging values of the M*N−1 points and the to-be-detected point are separately calculated, to obtain M*N−1 differences.

C3. Based on the obtained differences, determine whether the to-be-detected point is valid.

As described in step C2, the difference between the ranging values of the points in the to-be-detected neighborhood should be relatively small. This can be used as a determining standard, and the obtained M*N−1 differences are analyzed to determine whether the to-be-detected point is valid. Specifically, to exclude occasional interference and reduce an incorrect analysis, a number threshold can be preset. Then based on the number threshold, the following process can be performed to analyze whether the to-be-detected point is valid. The number of target differences in the obtained M*N−1 differences is counted, where the target difference refers to a difference less than a preset difference threshold. If the number of target differences reaches the number threshold, it is determined that the to-be-detected point is valid; otherwise, if the number of target differences is less than the number threshold, a result of the second filtering is required to determine whether the to-be-detected point is valid.

As an example, assuming that M is 3, N is 3, and the to-be-detected point is denoted as $P_0$, a 3*3 neighborhood can be determined from the original point cloud by using the to-be-detected point $P_0$ as a center. For ease of description, points in the neighborhood other than the to-be-detected point $P_0$ are denoted as $P_1$, $P_2$, $P_3$, $P_4$, $P_5$, $P_6$, $P_7$, and $P_8$, respectively. Then when the first filtering is performed, a difference between a ranging value of $P_1$ and a ranging value of $P_0$ can be calculated and denoted as $d_{01}$, a difference between a ranging value of $P_2$ and a ranging value of $P_0$ can be calculated and denoted as $d_{02}$, and so on, until a difference between the ranging value of $P_8$ and the ranging value of $P_0$ is calculated and denoted as $d_{08}$. In addition, $d_{01}$, $d_{02}$, ..., $d_{08}$ are compared with a preset difference threshold d separately, it can be learned how many differences of $d_{01}$, $d_{02}$, ..., $d_{08}$ are less than the difference threshold, that is, the number l of target differences can be learned. Assuming that the number threshold is $l_0$, when $l \geq l_0$, it can be determined that the to-be-detected point is valid, and the to-be-detected point can be retained. When $l < l_0$, it can be determined that the to-be-detected point is invalid, and a result of the second filtering is required to finally determine whether to retain or eliminate the to-be-detected point.

In some embodiments, for any to-be-detected point in the original point cloud data, a detailed procedure of the second filtering is as follows.

D1. Obtain at least two points in a preset direction by using the to-be-detected point as a center in the original point cloud data.

Usually, in point cloud obtained based on a target that forms a specific angle with a surface and a 0-degree (horizontal or vertical) direction of the LiDAR, a difference between ranging values of points may be significant. In this case, if the first filtering is still performed, a normal point may be incorrectly eliminated. For such case, second filtering is proposed as a supplement to the first filtering.

Each point in the point cloud can be denoted based on coordinates (x, y, d), where x is used to represent horizontal displacement of the point relative to the LiDAR, y is used to represent vertical displacement of the point relative to the LiDAR, and d represents depth information, that is, the ranging value. In this context, a direction mentioned in this embodiment of this application is actually not a direction presented by each point and the to-be-detected point in three-dimensional space; instead, the direction is a direction presented by each point and the to-be-detected point in a two-dimensional plane xy after the point cloud is projected to the plane xy (that is, a direction presented by each point and the to-be-detected point based on the x, y coordinates).

As an example, the preset directions may include a total of four directions: a horizontal direction, a vertical direction, and ±45 degree directions. It is conceivable that the four directions are centered on the to-be-detected point, and forms an "asterisk" shape on the plane xy. The to-be-detected point is denoted as P1, irrespective of the depth information, the to-be-detected point can be denoted as P1 $(x_0, y_0)$;

points in the horizontal direction of the to-be-detected point include: ..., P2 $(x_0-2, y_0)$, P3 $(x_0-1, y_0)$, P4 $(x_0+1, y_0)$, P5 $(x_0+2, y_0)$, ...;

points in the vertical direction of the to-be-detected point include: ..., P6 $(x_0, y_0-2)$, P7 $(x_0, y_0-1)$, P8 $(x_0, y_0+1)$, P9 $(x_0, y_0+2)$, ...;

points in the +45 degree direction of the to-be-detected point include: ..., P10 $(x_0-2, y_0-2)$, P11 $(x_0-1, y_0-1)$, P12 $(x_0+1, y_0+1)$, P13 $(x_0+2, y_0+2)$, ...; and points in the −45 degree direction of the to-be-detected point include: ..., P10 $(x_0-2, y_0+2)$, P11 $(x_0-1, y_0+1)$, P12 $(x_0+1, y_0-1)$, P13 $(x_0+2, y_0-2)$, ....

D2. Fit the at least two points and the to-be-detected point.

When there is only one preset direction, obtained ranging values of the at least two points and the to-be-detected point can be directly fitted.

When there are more than two preset directions, obtained ranging values of the at least two points and the to-be-detected point in one preset direction can be fitted in sequence. For example, firstly, ranging values of the at least two points in the horizontal direction of the to-be-detected point and the ranging value of the to-be-detected point are fitted. Then ranging values of the at least two points in the vertical direction of the to-be-detected point and the ranging value of the to-be-detected point are fitted. Next, ranging values of the at least two points in the +45 degree direction of the to-be-detected point and the ranging value of the to-be-detected point are fitted. Finally, ranging values of the at least two points in the −45 degree direction of the to-be-detected point and the ranging value of the to-be-detected point are fitted.

D3. Based on a fitting result, determine whether the to-be-detected point is valid.

In point cloud obtained based on a target that forms a specific angle with a surface and a 0-degree (horizontal or vertical) direction of the LiDAR, points in a specific direction should be capable of being fitted into a straight line. To save processing resources and improve processing efficiency, in this embodiment of this application, only targeted processing is performed based on preset directions of the to-be-detected point, and it is detected whether points in the preset directions can be fitted into a straight line. When a fitting result indicates that the at least two points in the preset direction in step D2 and the to-be-detected point can be fitted into a straight line, it can be determined that the to-be-detected point is valid.

It should be noted that, when there are more than two preset directions, provided that the fitting result indicates that at least two points in any preset direction and the to-be-detected point can be fitted into a straight line, the to-be-detected point can be determined to be valid, and in this case, another preset direction in which fitting is not performed can be ignored; otherwise, if the fitting result indicates that none of at least two points in each preset direction and the to-be-detected point can be fitted into a straight line, it is determined that the to-be-detected point is invalid, and the result of the first filtering is required to finally determine whether to retain or eliminate the to-be-detected point.

It can be learned from the above description that, in this embodiment of this application, anti-interference performance of the LiDAR is improved from two perspectives, to improve the detection accuracy of the LiDAR. On the one hand, from the perspective of laser emission, the corresponding emission code value set is determined for each emission unit, and the emission code value set satisfies the preset correlation condition. Specifically, when each emission code value set satisfies the preset autocorrelation condition, for each emission unit, it can be ensured that no echo signal crosstalk is caused when the emission unit performs emission in multiple different emission periods, to reduce the interference to the LiDAR. When there are parallel emission units, that is, emission units that approximately simultaneously perform emission in the same emission period, emission code value sets of any two parallel emission units both satisfy the preset cross-correlation condition, it can be ensured that no signal crosstalk is caused when these parallel emission units perform emission in the same emission period, to reduce the interference to the LiDAR. On the other hand, from the perspective of data processing, when the original point cloud data is obtained, the original point cloud data can be filtered in one or two filtering methods based on an actual situation, to remove a noise point from the original point cloud data, which can also reduce the interference to the LiDAR.

In the technical solution of this application, firstly, the emission code value set is determined for each emission unit of the LiDAR, where each emission code value set satisfies the preset autocorrelation condition. Then based on the emission code value set of each emission unit, each emission unit is controlled to emit the detection beam in each emission period, to obtain the original point cloud data. Finally, the first filtering and/or second filtering is performed on the original point cloud data to obtain the interference-free point cloud data. Therefore, the corresponding emission code value set is determined for each emission unit, and the emission code value set satisfies the preset correlation condition. In addition, filtering is performed on the original point cloud data, to remove a noise point from the original point cloud data, and finally, the interference-free point cloud data can be obtained, which can ensure that echo signal crosstalk is effectively reduced when the emission units perform emission in multiple different emission periods, to improve detection accuracy of the LiDAR. Further, the emission code is set for each emission unit in comprehensive consideration of various emission policies, filtering is also performed on the echo data, and therefore, it can be ensured that echo signal crosstalk can be controlled at a relatively low level regardless of what emission policy is used by the LiDAR to emit the detection beam, thereby further improving the detection accuracy of the LiDAR.

It should be understood that a sequence number of each step in the foregoing embodiments does not mean an execution sequence. An execution sequence of each process should be determined based on a function and internal logic of each process, and should not constitute any limitation to an implementation process of the embodiments of this application.

Figure 28:
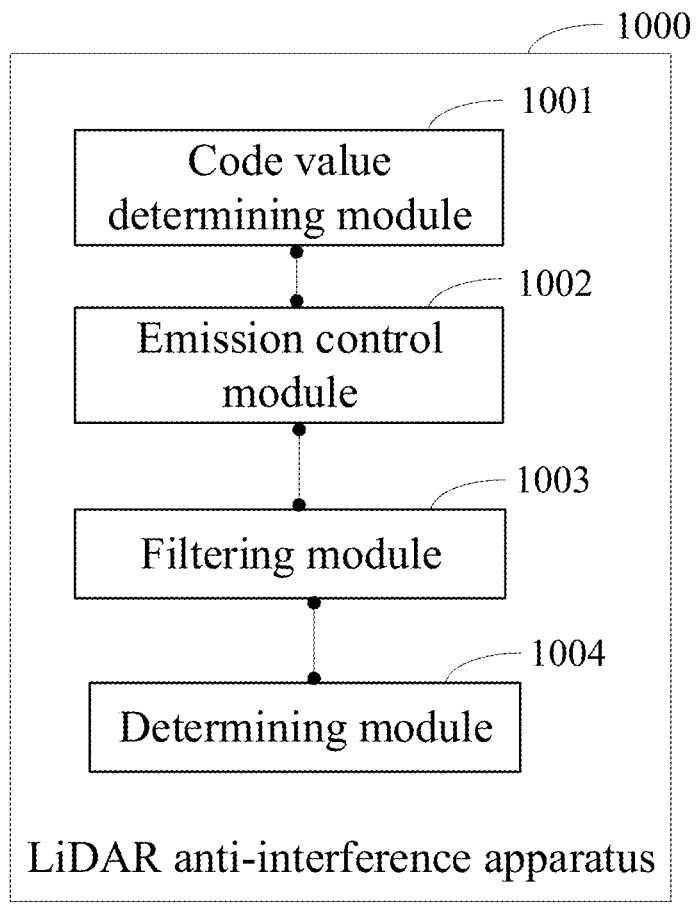
FIG. 28 is a structural block diagram of a LiDAR anti-interference apparatus according to an embodiment of this application.
Figure 29:
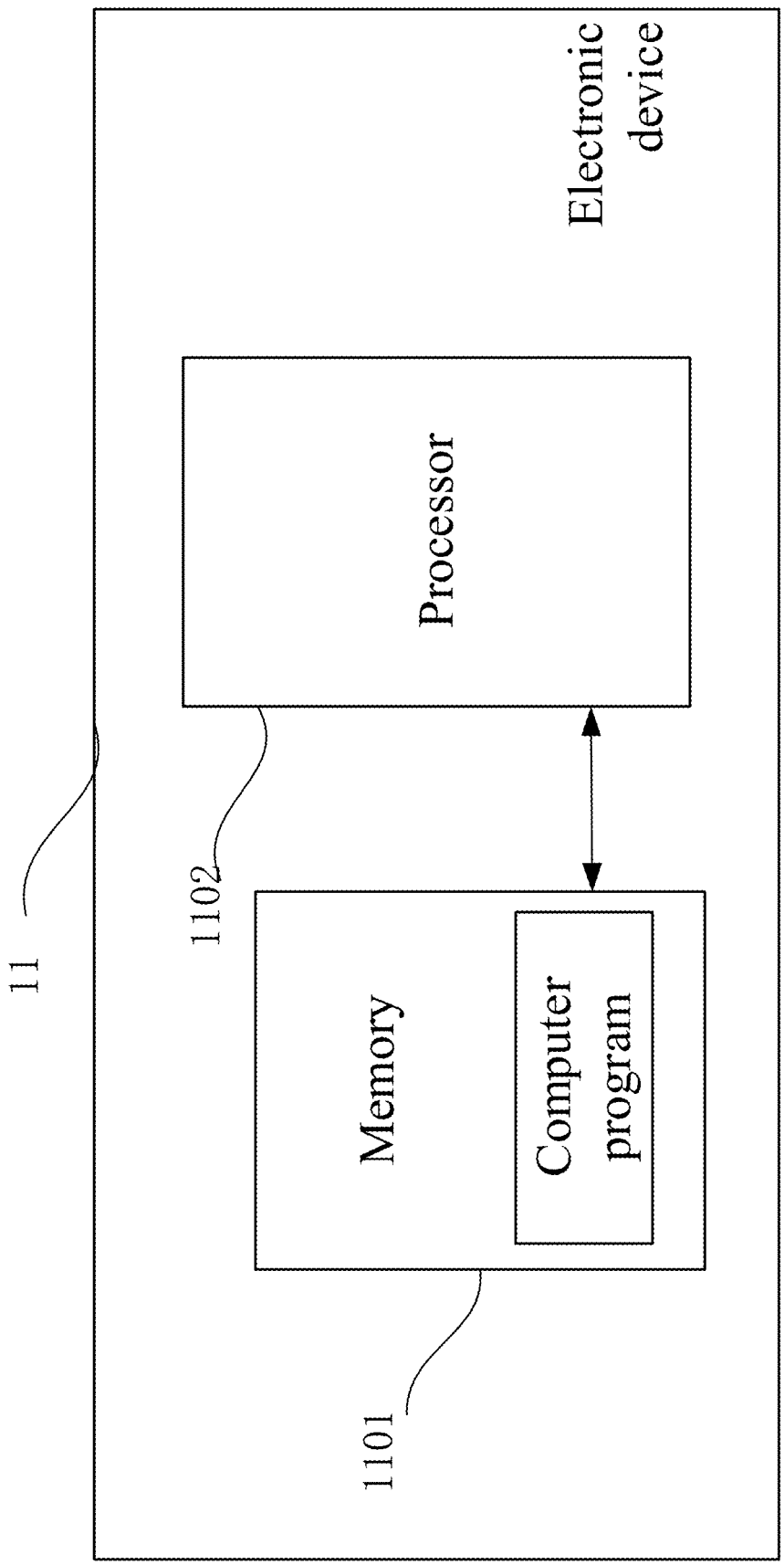
FIG. 29 is a schematic structural diagram of an electronic device according to an embodiment of this application.

Corresponding to the LiDAR anti-interference method provided above, an embodiment of this application further provides a LiDAR anti-interference apparatus. As shown in FIG. 28, the LiDAR anti-interference apparatus 1000 includes:

a code value determining module 1001, configured to determine an emission code value set for each emission unit of a LiDAR, where each emission code value set satisfies a preset autocorrelation condition;

an emission control module 1002, configured to, based on the emission code value set of each emission unit, control each emission unit to emit a detection beam in each emission period, to obtain original point cloud data; and a filtering module 1003, configured to perform first filtering and/or second filtering on the original point cloud data to obtain interference-free point cloud data.

In some embodiments, the LiDAR anti-interference apparatus 1000 further includes:

a determining module 1004, configured to, when the LiDAR includes multiple emission units, determine whether the multiple emission units include parallel emission units and/or serial emission units, where the code value determining module 1001 is further configured to set an emission code value set for the parallel emission units and/or the serial emission units based on a preset rule.

In some embodiments, the code value determining module 1001 is configured to, if the emission units of the LiDAR include parallel emission units, ensure that emission code value sets of any two of the parallel emission units both satisfy the preset cross-correlation condition, where the parallel emission units refer to emission units that simultaneously perform emission in the same detection period.

In some embodiments, the code value determining module 1001 is specifically configured to, if the emission units of the LiDAR include serial emission units, determine a difference between emission code values corresponding to the same emission of adjacent serial emission units in the same detection period is a preset threshold, where the serial emission units refer to emission units that sequentially perform emission based on preset timing in the same detection period.

Alternatively, the code value determining module 1001 is configured to determine an emission code value set for each emission unit of the LiDAR, where the LiDAR includes parallel emission units, emission code value sets of any two of the parallel emission units both satisfy the preset cross-correlation condition, and the parallel emission units refer to emission units that simultaneously perform emission in the same detection period.

An emission control module 1002 is configured to, based on the emission code value set of each emission unit, control each emission unit to emit a detection beam in each emission period, to obtain original point cloud data.

A filtering module 1003 is configured to perform first filtering and/or second filtering on the original point cloud data to obtain interference-free point cloud data.

Alternatively, the code value determining module 1001 is configured to determine an emission code value set for each emission unit of LiDAR, where the LiDAR includes the serial emission units, a difference between emission code values corresponding to the same emission of adjacent serial emission units in the same emission period is a preset threshold, and the serial emission units refer to emission units that sequentially perform emission based on preset timing in the same detection period.

An emission control module 1002 is configured to, based on the emission code value set of each emission unit, control each emission unit to emit a detection beam in each emission period, to obtain original point cloud data.

A filtering module 1003 is configured to perform first filtering and/or second filtering on the original point cloud data to obtain interference-free point cloud data.

In some embodiments, the filtering module 1003 includes:
a first determining unit, configured to, for each to-be-detected point in the original point cloud data, based on a preset neighborhood size, determine a to-be-detected neighborhood centered on the to-be-detected point, where the neighborhood size is determined based on a size of the emission code value set;
a first calculation unit, configured to calculate a difference between a ranging value of each point in the to-be-detected neighborhood other than the to-be-detected point and a ranging value of the to-be-detected point; and
a second determining unit, configured to, based on the difference, determine whether the to-be-detected point is valid.

In some embodiments, the second determining unit includes:
a counting sub-unit, configured to count the number of target distance differences in the distance differences, where the target distance differences are less than a preset distance difference threshold; and
a first determining sub-unit, configured to, if the number of target distance differences reaches a first preset number threshold, determine that the to-be-detected point is valid.

In some embodiments, the filtering module 1003 includes:
an obtaining unit, configured to, for each to-be-detected point in the original point cloud data, obtain at least two points in a preset direction by using the to-be-detected point as a center in the original point cloud data;
a fitting unit, configured to fit the at least two points and the to-be-detected point; and
a third determining unit, configured to, based on the fitting result, determine whether the to-be-detected point is valid.

In some embodiments, the third determining unit includes:
a second determining sub-unit, configured to, if the fitting result indicates that the at least two points and the to-be-detected point can be fitted into a straight line, determine that the to-be-detected point is valid.

It can be learned from the above description that in this embodiment of this application, anti-interference performance of the LiDAR is improved from two perspectives, to improve the detection accuracy of the LiDAR. In the technical solution of this application, the emission code value set is determined for each emission unit of the LiDAR, where each emission code value set satisfies the preset autocorrelation condition. Based on the emission code value set of each emission unit, each emission unit is controlled to emit the detection beam in each emission period, to obtain the original point cloud data. The first filtering and/or second filtering is performed on the original point cloud data to obtain the interference-free point cloud data. In this way, the corresponding emission code value set is determined for each emission unit, and the emission code value set satisfies the preset correlation condition. In addition, the original point cloud data is filtered, to remove the noise point from the original point cloud data, to finally obtain interference-free point cloud data. Therefore, it can be ensured that echo signal crosstalk is effectively reduced when the emission units perform emission in multiple different emission periods, to improve detection accuracy of the LiDAR. Further, the emission code is set for each emission unit in comprehensive consideration of various emission policies, filtering is also performed on the echo data, and therefore, it can be ensured that echo signal crosstalk can be controlled at a relatively low level regardless of what emission policy is used by the LiDAR to emit the detection beam, thereby further improving the detection accuracy of the LiDAR.

Corresponding to the LiDAR anti-interference method provided above, an embodiment of this application further provides an electronic device. Referring to FIG. 11, the electronic device 11 in this embodiment of this application includes a memory 1101, one or more processors 1102 (only one processor is shown in FIG. 11), and a computer program that is stored in the memory 1101 and capable of running on the processor. The memory 1101 is configured to store a software program and a unit, and the processor 1102 runs the software program and the unit stored in the memory 1101 to perform various functional applications and diagnoses, to obtain resources corresponding to the preset event. Specifically, when the processor 1102 runs the computer program stored in the memory 1101, the solutions of the various method embodiments can be implemented. Details are not described herein.

It should be understood that the processor 1002 may be a central processing unit (CPU), or may be another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The memory 1101 may include a read-only memory and a random access memory, and provide an instruction and data to the processor 1002. Some or all of the memories 1101 may also include a nonvolatile random access memory. For example, the memory 1101 may also store model information of a device.

It can be learned from the above description that, in this embodiment of this application, anti-interference performance of the LiDAR is improved from two perspectives, to improve the detection accuracy of the LiDAR. On the one hand, from the perspective of laser emission, the corresponding emission code value set is determined for each emission unit, and the emission code value set satisfies the preset correlation condition. Specifically, when each emission code value set satisfies the preset autocorrelation condition, for each emission unit, it can be ensured that no echo signal crosstalk is caused when the emission unit performs emission in multiple different emission periods, to reduce the interference to the LiDAR. When there are parallel emission units, that is, emission units that approximately simultaneously perform emission in the same emission period, emission code value sets of any two parallel emission units both satisfy the preset cross-correlation condition, it can be ensured that no echo signal crosstalk is caused when these parallel emission units perform emission in the same emission period, to reduce the interference to the LiDAR. On the other hand, from the perspective of data processing, when the original point cloud data is obtained, the original point cloud data can be filtered in one or two filtering methods based on an actual situation, to remove a noise point from the original point cloud data, which can also reduce the interference to the LiDAR.

A person skilled in the art can clearly understand that, for the purpose of convenient and brief description, division of the functional units and modules is taken as an example for illustration. In actual applications, the functions can be allocated to different units and modules and implemented according to a requirement, that is, an inner structure of an apparatus is divided into different functional units and modules to implement all or part of the functions described above. The functional units and modules in the embodiments may be integrated into one processing unit, or each unit may exist alone physically, or two or more units may be integrated into one unit. The integrated unit may be implemented in a form of hardware, or may be implemented in a form of a software functional unit. In addition, specific names of the functional units and modules are only for the convenience of distinguishing one another, and are not intended to limit the protection scope of this application. For a detailed working process of units and modules in the system, reference may be made to a corresponding process in the foregoing method embodiments. Details are not described again herein.

In the foregoing embodiments, the descriptions of the embodiments have respective focuses. For a part that is not described in detail in one embodiment, reference may be made to related descriptions in other embodiments.

A person of ordinary skill in the art may be aware that the units and algorithm steps in the examples described with reference to the embodiments disclosed in this specification can be implemented by electronic hardware or a combination of peripheral device, software, and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the embodiments provided in this application, it should be understood that the disclosed apparatus and method may be implemented in other manners. For example, the embodiments of the described system are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

When the integrated unit is implemented in the form of a software functional unit and sold or used as an independent product, the integrated module or unit may be stored in a computer-readable storage medium. Based on such understanding, some or all of the processes for implementing the methods in the embodiments of this application may be completed by related hardware instructed by a computer program. The computer program may be stored in a computer-readable storage medium. When the computer program is executed by the processor, the steps of the foregoing method embodiments are implemented. The computer program includes computer program code, and the computer program code may be in a form of source code, object code, an executable file, some intermediate forms, or the like. The computer-readable storage medium may include any entity or apparatus capable of carrying the computer program code, such as a recording medium, a USB flash drive, a removable hard disk, a magnetic disk, an optical disc, a computer-readable memory, a read-only memory (ROM), a random access memory (RAM), an electrical carrier signal, a telecommunications signal, a software distribution medium, or the like. It should be noted that the content included in the computer-readable storage medium may be appropriately added or deleted according to requirements of legislation and patent practice in a jurisdiction. For example, in some jurisdictions, according to legislation and patent practice, the computer-readable storage medium does not include an electrical carrier signal or a telecommunication signal.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A LiDAR anti-interference method applied to a LiDAR, wherein the LiDAR comprises a laser emission array and a laser receiving array, and the method comprises:
    determining at least two laser emission units to be turned on based on light spot offset of each laser emission unit in a measurement period, wherein the at least two laser emission units to be turned on are configured to emit laser beams at intervals of a preset number of physical channels, wherein the at least two laser emission units to be turned on are in different laser emission groups, and the at least two laser emission units to be turned on satisfy a physical condition of no optical crosstalk; each laser emission group is disposed on an emission plate; laser emitters in the same group are in a relationship of serial emission, but laser emitters in different groups are in a relationship of parallel emission;
    controlling the at least two laser emission units to emit laser beams based on a preset rule; and
    controlling respectively corresponding laser receiving units of the at least two laser emission units to receive echo beams,
    wherein the laser receiving units corresponding to the at least two laser emission units are arranged at intervals of a preset number of physical channels.

2. The method according to claim 1, wherein controlling the at least two laser emission units to emit laser beams based on the preset rule comprises:
    controlling the at least two laser emission units to emit the laser beams at time intervals based on an actual ranging need.

3. The method according to claim 1, wherein the method further comprises:
    setting emission code value sets for the at least two laser emission units based on a preset emission encoding rule; and
    ensuring that the emission code value sets of the at least two laser emission units satisfy a preset cross-correlation condition.

4. The method according to claim 1, wherein after controlling respectively the corresponding laser receiving units of the at least two laser emission units to receive the echo beams, the method further comprises:

performing first filtering or second filtering on obtained original point cloud data to obtain interference-free point cloud data.

5. The method according to claim 4, wherein the first filtering comprises:

for each to-be-detected point in the original point cloud data, based on a preset neighborhood size, determining a to-be-detected neighborhood, wherein a size of the to-be-detected neighborhood is equal to the preset neighborhood size, and the to-be-detected point is the center point of the to-be-detected neighborhood;

calculating a difference between a ranging value of each point in the to-be-detected neighborhood other than the to-be-detected point and a ranging value of the to-be-detected point; and based on the difference, determining whether the to-be-detected point is valid.

6. The method according to claim 4, wherein the second filtering comprises:

for each to-be-detected point in the original point cloud data, obtaining at least two points in a preset direction by using the to-be-detected point as a center in the original point cloud data;

fitting the at least two points and the to-be-detected point; and based on a fitting result, determining whether the to-be-detected point is valid, wherein based on the fitting result, determining whether the to-be-detected point is valid comprises:

when the fitting result indicates that the at least two points and the to-be-detected point is fitted into a straight line, determining that the to-be-detected point is valid.

7. A LiDAR anti-interference apparatus comprising a LiDAR, wherein the LiDAR comprises a laser emission array and a laser receiving array, and the apparatus further comprises:

a unit determining module, configured to determine at least two laser emission units to be turned on based on light spot offset of each laser emission unit in a measurement period, wherein the at least two laser emission units to be turned on are configured to emit laser beams at intervals of a preset number of physical channels, wherein the at least two laser emission units to be turned on are in different laser emission groups, and the at least two laser emission units to be turned on satisfy a physical condition of no optical crosstalk; each laser emission group is disposed on an emission plate; laser emitters in the same group are in a relationship of serial emission, but laser emitters in different groups are in a relationship of parallel emission; and a target detection module, configured to control the at least two laser emission units to emit laser beams based on a preset rule, and control respectively corresponding laser receiving units of the at least two laser emission units to receive echo beams, wherein the laser receiving units corresponding to the at least two laser emission units are arranged at intervals of a preset number of physical channels.

* * * * *